United States Patent
Montemayor Elosua et al.

(10) Patent No.: US 12,548,416 B1
(45) Date of Patent: Feb. 10, 2026

(54) AUDIO DATA PROCESSING AND OUTPUT IMPROVEMENT

(71) Applicant: Block, Inc., Oakland, CA (US)

(72) Inventors: Juan Carlos Montemayor Elosua, Ardsley, NY (US); Jesse Gottlieb, Ithaca, NY (US)

(73) Assignee: Block, Inc., Oakland, CA (US)

( * ) Notice: Subject to any disclaimer, the term of this patent is extended or adjusted under 35 U.S.C. 154(b) by 34 days.

(21) Appl. No.: 18/232,261

(22) Filed: Aug. 9, 2023

(51) Int. Cl.
    *G08B 3/00*     (2006.01)
    *G08B 21/18*     (2006.01)
    *G10L 13/08*     (2013.01)

(52) U.S. Cl.
    CPC .............. *G08B 3/00* (2013.01); *G08B 21/18* (2013.01); *G10L 13/08* (2013.01)

(58) Field of Classification Search
    CPC ........................................................ G08B 3/00
    See application file for complete search history.

(56) References Cited

U.S. PATENT DOCUMENTS

| | | | | |
|---|---|---|---|---|
| 8,799,083 B1 * | 8/2014 | Silver | .................. | G06Q 30/02 705/26.1 |
| 2002/0143655 A1 * | 10/2002 | Elston | ................... | G06Q 30/06 705/26.81 |
| 2015/0310408 A1 * | 10/2015 | Anderson | ............. | G06Q 10/02 705/39 |
| 2016/0264394 A1 * | 9/2016 | Hershberger | ........ | B67D 1/0888 |
| 2016/0284198 A1 * | 9/2016 | Tarn | ........................ | A61M 1/14 |
| 2018/0008051 A1 * | 1/2018 | Byrne | .................... | A47B 97/00 |
| 2020/0043107 A1 * | 2/2020 | Bertness | ............... | G06Q 50/12 |
| 2020/0367687 A1 * | 11/2020 | Wang | .................... | A47J 27/004 |
| 2020/0367690 A1 * | 11/2020 | Wang | .................. | A47J 43/0722 |
| 2020/0372589 A1 * | 11/2020 | Wang | .................... | G06Q 50/12 |
| 2021/0406536 A1 * | 12/2021 | McLean | .................. | G06F 16/65 |
| 2022/0207627 A1 * | 6/2022 | Swanson | ............. | G06Q 20/202 |
| 2023/0000277 A1 * | 1/2023 | Wang | .................... | A47J 36/32 |
| 2023/0214735 A1 * | 7/2023 | Garcia-Brosa | ..... | G06Q 10/0833 705/7.13 |
| 2023/0297906 A1 * | 9/2023 | Garcia-Brosa | ....... | G06Q 20/102 705/7.13 |

* cited by examiner

*Primary Examiner* — Travis R Hunnings
(74) *Attorney, Agent, or Firm* — Lee & Hayes, P.C.

(57) ABSTRACT

Techniques described herein are directed to, among other things, determining a status change of a data object representing an order and determining attributes of the order. The systems described herein may then determine to provide an audible alert about the order based at least in part on the status change and the attributes of the order. Predefined audio data associated with the status change of the order may be identified and utilized to cause output, on a speaker of a device associated with the data object, of the audible alert about the order.

20 Claims, 13 Drawing Sheets

AUDIO DATA PROCESSING AND OUTPUT IMPROVEMENT

TECHNICAL FIELD

Various environments rely on output of audio. Selection of audio data at appropriate times and output of corresponding audio with certain attributes may be important for the environment and/or users within the environment.

BRIEF DESCRIPTION OF THE DRAWINGS

Features of the present disclosure, its nature and various advantages, will be more apparent upon consideration of the following detailed description, taken in conjunction with the accompanying drawings. The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
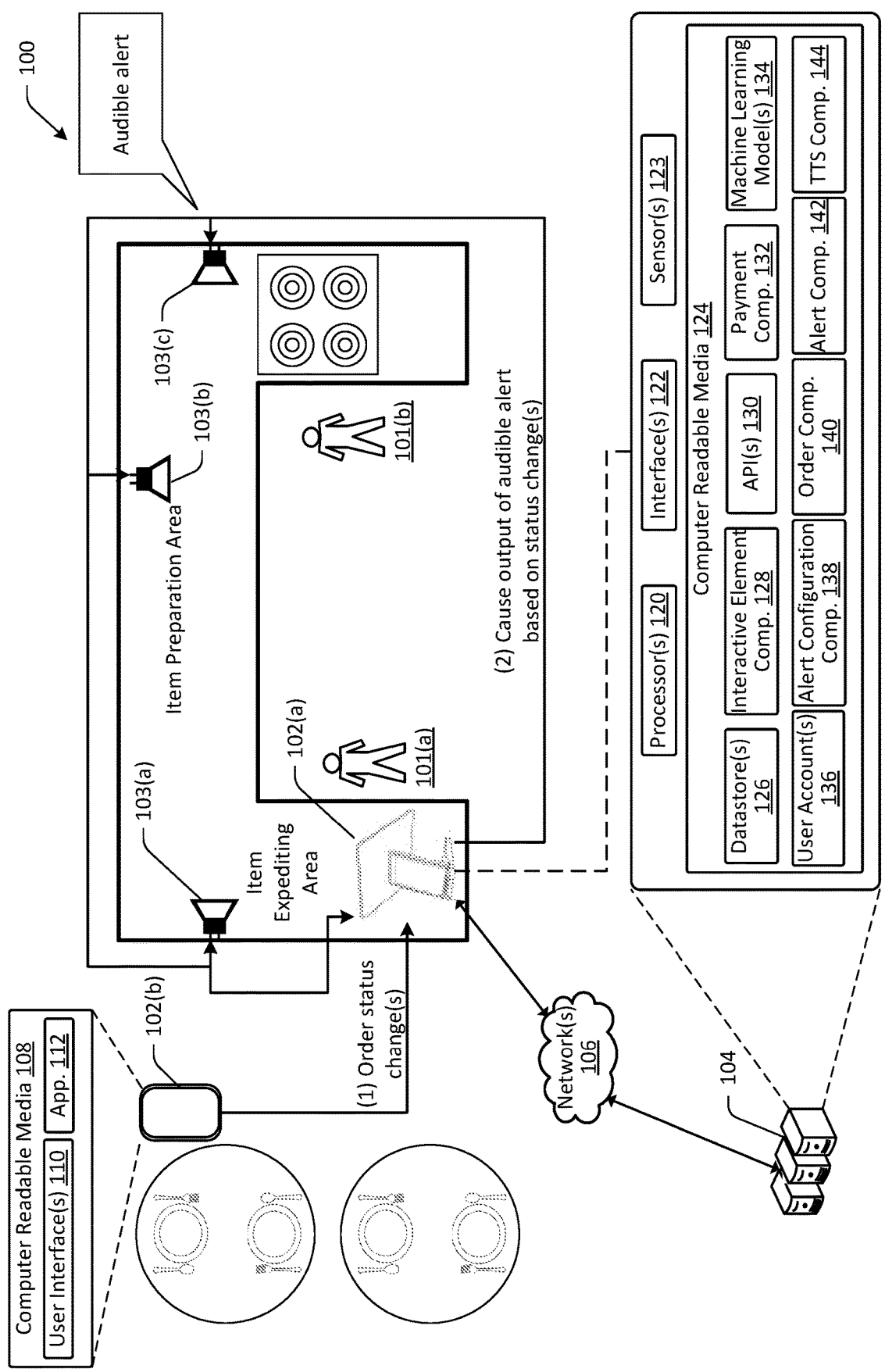
FIG. 1 is an example environment for audio data processing and output improvement, according to an embodiment described herein.

Methods and systems described herein are directed to, among other things, audio data processing and output improvement. Take, for example, a situation where an entity (such as an entity associated with a restaurant, as a nonlimiting example) is engaged in taking and satisfying customer orders for items. In a nonlimiting example, a restaurant entity may take orders for food items from multiple guests that are dining in the restaurant itself, that have ordered food items for pickup, that have ordered food items for delivery, and the like. In these situations, multiple orders may be taken and/or be at various stages of completion at any given time. Additionally, multiple users (e.g., employees of the restaurant entity) may be engaged in various tasks to satisfy the orders, such as cooking, serving, preparing, expediting, and the like. Given the above, the environment in which such users operate may be loud, busy, and/or complex. When order changes occur and/or when other trigger events occur, alerting these users may be important to ensure that the users perform responsive actions quickly. While these alerts may be presented on a display of a user device located in the environment (e.g., a point of sale (POS) device), visual alerts may not be effective in certain situations. As such, it would be advantageous to provide audible alerts of such trigger events such that users in the environment are audibly alerted to the trigger events. Additionally, intelligently selecting these audible alerts, intelligently adjusting characteristics of the audible alerts to promote successful presentation of the audible alerts to the users, and/or intelligently selecting one or more speakers to output the audible alerts may enhance the alerting process.

Described herein, among other things, are methods and systems for audio data processing and output improvement to provide such audible alerts. To do so, in examples, a user interface may be generated and may be configured to present functionality for customizing audible alerts to be output in association with a given entity. The functionality of the user interface may include options to select event types corresponding to different trigger events, audible alert sounds to select from, the ability to generate customized text-to-speech (TTS) alerts, and/or the ability to set various preferences, such as speaker selection preferences, user identifier preferences, volume controls, speaker arbitration preferences, and the like. In examples, the entity may utilize the user interface to customize the audible alerts to be output, and audio data (e.g., audio files) may be generated and stored in association with the entity for use in outputting audible alerts as described below in more detail. In other examples, particularly in the absence of user input data indicating customization of audible alerts, one or more default audible alerts (described herein as default audible sounds in some instances) may be associated with a given entity for output as described below in more detail.

To determine when and how to output audible alerts, a user device and/or a remote system associated with the user device may be configured to receive data indicating order status changes and/or other trigger events and to process that data to determine whether to output an audible alert. In examples, the user device and/or the remote system may determine an event type associated with the trigger event and may determine if that event type has been predefined (as a default and/or based on customization by the entity) to be associated with output of an audible alert. In examples where an audible alert is to be output, the user device and/or the remote system may select which of potentially multiple audible alerts are to be output. Selection of an audible alert may be based at least in part on the trigger event type, account data associated with the entity, an order status type, ambient sound data corresponding to ambient sound within the environment in question, image data corresponding to images of the environment, sensor data indicating other environmental conditions of the environment including identification of given users in the environment, a venue type associated with the entity, whether multiple alerts are to be output at least partially simultaneously, machine learning results associated with audible alert selection, and the like. In addition to selecting the audible alert from potentially multiple audible alerts, the user device and/or the remote system may intelligently determine whether to adjust characteristics of the audible alert such that when the audible alert is output it is formatted for the users in the environment to hear and respond to the audible alert. Example, nonlimiting characteristics of the audible alert may include a volume of the alert, atone of the alert, a cadence of the alert with respect to other alerts, a speed at which the alert is output, a start time and/or delay for output of the alert, and the like. Audible alert selection and/or audible alert characteristic adjustment may also be based at least in part on results from trained machine learning models, as described in more detail below.

Furthermore, the user device and/or the remote system may be configured to perform processes for prioritizing output of audible alerts on the fly. For example, multiple order status changes and/or other trigger events may occur at or near the same time. Output of multiple audible alerts at the same time may be disadvantageous or otherwise confusing for the users in the environment. As such, the audible alerts for the multiple trigger events may be prioritized, such as by event type for example, such that the audible alerts are output sequentially based at least in part on a prioritized order of the audible alerts. In examples, prioritization of the audible alerts may result in a given, highly prioritized audible alert being output instead of outputting a less prioritized audible alert. In these examples, unnecessary or otherwise unwanted audible alerts that would otherwise be output may not be output. In still other examples, the multiple audible alerts may be output at least in part at the same time. In these examples, the user device and/or the remote system may be configured to select audible alerts that may be harmonized or otherwise combined such that when those audible alerts are output at least partially simultaneously all of the output audible alerts are still perceptible to the human ear at the same time. Audible alert prioritization use may also be based at least in part on results from trained machine learning models, as described in more detail below.

In addition to selecting an audible alert to be output and/or determining whether to adjust one or more characteristics of the audible alert, the user device and/or the remote system may be configured to intelligently select a speaker of potentially multiple speakers in the environment to output the audible alert. To select a speaker, the user device and/or the remote system may utilize some or all of the data types described above with respect to selection of the audible alert. Those data types include, for example, the trigger event type, account data associated with the entity, an order status type, ambient sound data corresponding to ambient sound within the environment in question, image data corresponding to images of the environment, sensor data indicating other environmental conditions of the environment including identification of given users in the environment, a venue type associated with the entity, whether multiple alerts are to be output at least partially simultaneously, machine learning results associated with audible alert selection, and the like. The data types for selecting a speaker may also include user proximity to various speakers within the environment, as will be described in more detail below. In addition to selecting a given speaker to output the audible alert, the user device and/or the remote system may be configured to intelligently determine when to present a visual alert along with the audible alert. Speaker selection may also be based at least in part on results from trained machine learning models, as described in more detail below.

By so doing, audible alerts may be selected and improved, and speakers may be intelligently selected, to cause output of audible alerts in an environment in a way that promotes user responses to those audible alerts in a time sensitive and dynamic manner. Doing so may promote a better, quicker customer experience for customers of the entity in question and may promote a better working environment for the user (e.g., the employees) of the entity.

The systems and methods described herein address several computer-centric problems with computer-centric solutions. The systems and methods described herein describe how to generate and utilize customized audio data files on the fly to output audible alerts in a given environment. For example, the generation and utilization of audio data files is specific to computing environment and has no human-based analogy. Additionally, as described below, audio data and image data analysis to select audible alerts and/or to adjust characteristics of those audible alerts on the fly is a uniquely computer-centric problem. That problem is solved by the present disclosure by performing various forms of acoustic event detection from audio data analysis and/or by performing computer vision analysis of image data, both computer-centric solutions to the computer-centric problem outlined above.

Additionally, the systems and methods described herein address the computer-centric problem of how to generate customized synthetic speech using TTS processing described herein. For example, the generation of audio data that represents synthetic speech is unique to computing environments and has no human analog. Indeed, generation of synthetic speech that is customized to a specific entity, particularly utilizing user input data made available by customized graphical user interfaces, is a computer-centric solution to the computer-centric problem noted above.

Furthermore, the systems and methods described herein address the computer-centric problem of how to generate and train machine learning models to improve output of audible alerts. As described in more detail herein, the present disclosure describes the ability to generate machine learning models that are configured to intelligently select audible alerts, intelligently adjust characteristics of audible alerts on the fly, intelligently prioritize audible alerts, and/or to intelligently select speaker(s) for output of audible alerts. Those machine learning models are then trained as described herein to adjust factors and/or factor weightings that improve these selections and determinations in a way that, by the nature of machine learning, cannot be performed by a human.

Also, the systems and methods described herein address the computer-centric problem of how to filter and accurately present information associated with audible alerts via a graphical user interface on a user device having a limited screen size. For example, user devices (particularly certain types of POS devices) have a limited screen size that may not be able to display all information associated with all possible trigger event types and customization options for customizing audible alerts. To solve this computer-centric problem, the present systems and methods describe the generation of a graphical user interface that filters customization options based at least in part on data known by the user device and/or the remote system at issue, such as venue type and/or event type associated with an entity. This data may be utilized to filter customization options to be displayed on the user device with the limited screen size. Doing so involves the augmentation of the user interface for specific customization sessions on the fly and in a time sensitive manner. Additionally, given the limited screen size issue described above, generating and utilizing audible alerts in place of visual alerts allows for the screen of the POS device at issue to be freed up for display of other information (given that the otherwise visual alert may not be displayed).

Additionally, the systems and methods described herein address the computer-centric problem of how to personalize features relating to determining which trigger events cause audible alerts to be output. As described herein, determining when and how to output trigger events may be a time sensitive endeavor that may include complex computer processing techniques that may be performed on the fly and based at least in part on data that is specific to a given entity, a specific environment, a specific trigger event, and the like. A complex interaction between data types, user device and/or remote system components, and/or entities is described herein to achieve quick, relevant audible alert output in a way that marks a unique combination of technologies as well as the incorporation of novel technologies to solve the computer-centric problem of feature personalization.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 is an example environment for audio data processing and output improvement, according to an embodiment described herein. In one implementation, the environment 100 may include several users 101(a)-(b) (which in examples may be described as employees and/or entities) associated with user devices 102(a)-(b) (which may be described as entity devices). The environment 100 may also include and a remote system 104 (which in examples may be described as a payment processing service), which can communicate via network(s) 106. The environment 100 may also include one or more speakers 103(a)-(c).

Each of the devices can comprise one or more computing devices. Additional details associated with the user devices 102(a)-(b), the speakers 103(a)-(c), the remote system 104, and the network(s) 106 are described below with reference to FIGS. 9-13.

The user devices 102(a)-(b) may include one or more components such as one or more processors, one or more network interfaces, computer-readable media (CRM) 108, one or more microphones, one or more speakers, and/or one or more displays. The microphones may be configured to receive audio input from the environment 100 and to generate corresponding audio data, which may be utilized as discussed herein. The speakers of the user devices 102(a)-(b) and/or the speakers 103(a)-(c) may be configured to output audio. The displays may be configured to present graphical user interfaces. In some examples, the displays can output images, videos, or the like via such graphical user interfaces.

The CRM 108 of the user devices 102 (a)-(b) may include one or more applications or other components. For example, the one or more applications or other components can include one or more user interfaces 110 and/or an application 112. A user interface 110 can be included in the application 112 as an interstitial, widget, or pop-up display. The CRM 108 can include additional or secondary applications such as an application store, a music streaming application, a messaging application, an email application, a forum application, a spreadsheet application, a loyalty application, an inventory application, or the like. In some examples, the applications can be provided by a same service provider (e.g., the remote system 104) or different service providers, such as the remote system and one or more third-party service providers.

The applications or other components may be configured to execute in the foreground and background of the user devices 102(a)-(b). For example, the application 112 may be configured to execute in the foreground when a user is actively engaged in one or more of the functionalities of the application 112. In some implementations, the application 112 may be configured to execute in the background when a user is not actively engaged in one or more of the functionalities, but the application 112 is still "open" and is capable of communicating with other applications on the user devices 102(a)-(b) and/or with remote system 104. For example, one of the other applications may be executing in the foreground and an interaction with an interactive element may occur. The application 112, running in the background, may be caused to be displayed in the foreground in response to selection of the interactive element in the other application.

The remote system 104, which can be associated with one or more computing devices, such as server computing devices, and/or the user device 102(a) may include components such as one or more processors 120, one or more network interfaces 122, one or more sensors 123, and/or CRM 124. The CRM 124 may include one or more components such as, for example, one or more datastores 126, an interactive element component 128, one or more application programming interfaces (APIs) 130, a payment component 132, one or more machine learning models 134, one or more user accounts 136, an alert configuration component 138, an order component 140, an alert component 142, and/or a TTS component 144. These components will be described below by way of example.

In at least one example, the remote system 104 can expose functionality and/or services via the one or more APIs 130, thereby enabling functionality and/or services described herein to be integrated into various functional components of the environment 100. The API(s) 130, which can be associated with the remote system 104, can expose functionality described herein and/or avail payment services to various functional components associated with the environment 100. At least one of the API(s) 130 can be a private API, thereby availing services and/or functionalities to functional components (e.g., applications, etc.) that are developed internally (e.g., by developers associated with the payment service). At least one of the API(s) 130 can be an open or public API, which is a publicly available API that provides third-party developers (e.g., social media platforms, spreadsheet application developers, etc., as described herein) with programmatic access to a proprietary software application or web service of the payment service. That is, the open or public API(s) can enable functionality and/or services of the payment service to be integrated into one or more applications. The API(s) 130 can include sets of requirements that govern how applications, or other functional components, can interact with one another.

In some examples, the remote system 104 can provide third-party entities with a software developer kit ("SDK") that may utilize functionality exposed by the API(s) 130. The SDK can include software development tools that allow a third-party developer (i.e., a developer that is separate from the payment service) to include functionality and/or avail services as descried herein. The SDK and/or the API(s) 130 may include one or more libraries, programming code, executables, other utilities, and documentation that allows a developer to directly include functionality and/or avail services described herein within an application.

The datastore(s) 126 can store, among other types of data, user profiles. For instance, a user profile of the user can store payment data associated with payment instrument(s) or user account(s) of a user. In some examples, an account maintained by the remote system 104 on behalf of the user can be mapped to, or otherwise associated with, the user profile. Such an account can be associated with a stored balance maintained by the remote system 104. In some examples, funds associated with the stored balance can be received from peer-to-peer payment transactions (e.g., payment transactions between users), deposits from employers, transfers from external accounts of the user, and so on. In some examples, a user profile can indicate multiple user accounts or stored balances associated with a user profile, which can be associated with different assets, such as stocks, cryptocurrency, non-fungible tokens, or the like. Additional details associated with data that can be stored in association with user profiles are provided below. The datastores 126 may store information associated with the user accounts 136 and/or may be configured to receive information associated with the user accounts 136. Additionally, the datastores 126 may include information associated with user locations and/or preference data as described herein.

The interactive element component 128 may be configured to generate interactive elements associated with the functionality of data objects. Such interactive elements may be included in user interfaces 110 that are usable by the users 101(a)-(b) to provide preference data, to customize audible alerts and/or preferences associated with audible alerts, and the like. The interactive element component 128 may be utilized to generate a data object that associates entities, orders, order status changes, other types of trigger events, and audible alerts with each other.

The payment component 132 may be configured to receive data for processing transactions, including facilitating withdrawals and deposits of funds from and to certain accounts. The status of various transactions, as maintained by the payment component 132, may indicate order statuses and/or order status changes and/or other trigger events as described herein.

The remaining features of the environment 100 as shown in FIG. 1 will be described below by way of example.

For example, an entity, such as a restaurant entity, may take orders for food items from multiple guests that are dining in the restaurant itself, that have ordered food items for pickup, that have ordered food items for delivery, and the like. In the example of FIG. 1, at step 1, the user device 102(b) may be configured to utilize the application 112 to take orders and/or to make changes to preexisting orders. Order status changes may be generated by the user device 102(b) and/or one or more other devices and/or systems and may be sent to a main user device, such as the user device 102(a) (which may be a POS device that hosts or otherwise acts as a hub for other user devices associated with the entity in question). In these situations, multiple orders may be taken and/or at various stages of completion at any given time. Additionally, multiple users (e.g., employees of the restaurant entity) may be engaged in various tasks to satisfy the orders, such as cooking, serving, preparing, expediting, and the like. It would be advantageous to provide audible alerts of such trigger events such that users in the environment are audibly alerted to the trigger events. Additionally, intelligently selecting these audible alerts, intelligently adjusting characteristics of the audible alerts to promote successful presentation of the audible alerts to the users, and/or intelligently selecting one or more speakers to output the audible alerts may enhance the alerting process.

To do so, in examples, a user interface 110 may be generated and may be configured to present functionality for customizing audible alerts to be output in association with a given entity. The functionality of the user interface may include options to select event types corresponding to different trigger events, audible alert sounds to select from, the ability to generate customized TTS alerts, and/or the ability to set various preferences, such as speaker selection preferences, user identifier preferences, volume controls, speaker arbitration, and the like. In examples, the entity may utilize the user interface 110 to customize the audible alerts to be output, and audio data (e.g., audio files) may be generated and stored in association with the entity for use in outputting audible alerts as described herein below in more detail. In other examples, particularly in the absence of user input data indicating customization of audible alerts, one or more default audible alerts may be associated with a given entity for output as described herein below in more detail.

To generate the audio data described above, in examples where the user input data to the user interface 110 indicates selection of a predefined sound (e.g., a predefined beep, tone, series of tones, speech, etc.), the user account 136 for the entity in question may be updated to include an audio file that represents the predefined sound. Additionally, or alternatively, the user account 136 may be updated to include an identifier of the audio file as maintained elsewhere on the user device 102(a) and/or the remote system 104 such that the identifier may be utilized to call a database of audio files for the relevant file when the audible alert is to be output. In other examples, the user interface 110 may provide the ability to record a customized sound unique to the entity. In these examples, a new audio file representing the customized sound may be generated and stored. In still other examples, the user interface 110 may receive user input data representing text as typed or otherwise provided by a user of the user interface 110. This text may be utilized by the TTS component 144 to generate synthetic speech represented in an audio file. TTS processing by the TTS component 144 may include identifying components of text data that relate to phonemes and associating predefined audio data of those phonemes with the components of the text data. Phoneme combinations may be determined to generate synthetic speech that sounds similar to speech as if spoken by a person.

To determine when and how to output audible alerts, the order component 140 may be configured to receive data indicating order status changes and/or other trigger events and to process that data to determine whether to output an audible alert. As used herein, an order status change may include any change to a preexisting order associated with the entity at issue. Examples of such order changes include order cancellations, item modifications, removal of items from orders, inclusion of new items in orders, changing of pickup and/or delivery times, changes to customer information, changes to payment instrument information, dietary corrections, customer preference changes, and the like. These order status changes may be examples of trigger events. Other trigger events may include, as nonlimiting examples, wait times exceeding one or more thresholds, other time-related events, customer location changes, the status of a given order remaining unchanged for at least a threshold period of time, and the like. In general, any change to an order and/or circumstances associated with an order may be considered a trigger event that may be associated with an audible alert.

In examples, the alert configuration component 138 may determine an event type associated with the trigger event and may determine if that event type has been predefined (as a default and/or based on customization by the entity) to be associated with output of an audible alert. For example, as a threshold matter, the alert configuration component 138 may determine whether the trigger event in question is associated with an audible alert. For example, some trigger events may not be sufficiently important generally and/or to a specific entity to merit output of an audible alert and thus not all trigger events may be associated with an audible alert. The user account 136 and/or other data available to the user device 102(*a*) and/or the remote system 104 may be queried to determine if a given trigger event type is associated with output of an audible alert for a given circumstance.

In examples where an audible alert is to be output, the alert configuration component 138 may select which of potentially multiple audible alerts are to be output. Selection of an audible alert may be based at least in part on the trigger event type, account data associated with the entity, an order status type, ambient sound data corresponding to ambient sound within the environment in question, image data corresponding to images of the environment, sensor data indicating other environmental conditions of the environment including identification of given users in the environment, a venue type associated with the entity, whether multiple alerts are to be output at least partially simultaneously, machine learning results associated with audible alert selection, and the like. For example, the alert configuration component 138 may be configured to query the sensors 123, the user account 136, the user device 102(*b*), and/or other components to acquire some or all of the data types described above. This data may be utilized by the alert configuration component 138 to determine which audible alert to select. In examples, selection of the audible alert may be based on heuristics and/or rules datasets that the alert configuration component 138 is configured to utilize with the data types described above as input. Additionally, or alternatively, a machine learning model 134, including a trained machine learning model 134, may be utilized by the alert configuration component 138 to select an audible alert. The machine learning model 134 may format the data types as input to the machine learning model 134 and may be configured to determine factors from the data types that are useful in selecting audible alerts as well as factor weightings to apply.

To provide an example with respect to ambient sound in the environment. The sensors 123 may be utilized to generate audio data that represents ambient sound detected by a microphone. An ambient sound type of the ambient sound (e.g., dishwasher running, people talking, register sounds, blender sounds, etc.) may be determined by analyzing characteristics of the audio data and comparing those characteristics to reference characteristics of reference ambient sounds. When certain ambient sound types are determined and/or when an amplitude value indicating volume of the sound satisfies a threshold amplitude, given audible alerts may be selected over other audible alerts. For example, a given ambient noise may be the hum of machinery in the environment. In this example, an audible alert with a higher pitch and/or otherwise a different type of sound than a low-frequency humming noise may be selected. In another example, a given ambient noise may be the beeping of an oven, an expediting computing device, and/or sounds from a point of sale terminal. In this example, an audible alert may be selected with a sound that differs from a beeping noise. In still another example, the given ambient noise may have a certain volume that may be described as loud to those hearing it. In this example, an audible alert with a distinctive sound and/or that plays for a long period of time may be selected to audibly compete with the ambient noise.

The sensors 123 as described herein may be any sensors 123 that are configured to detect environmental conditions of an environment where the user device 102(*a*) is disposed and/or detect objects and/or characteristics of objects associated with the environment. Nonlimiting examples of sensors 123 may include, microphones, cameras, temperature sensors, alarm system sensors, wearable devices, mobile devices such as phones, device beacons, and the like.

In addition to selecting the audible alert from potentially multiple audible alerts, the alert configuration component 138 may intelligently determine whether to adjust characteristics of the audible alert such that when the audible alert is output it is improved for the users in the environment to hear and respond to the audible alert. Example, nonlimiting characteristics of the audible alert may include a volume of the alert, a tone of the alert, a cadence of the alert with respect to other alerts, a speed at which the alert is output, a start time for output of the alert, and the like. The alert configuration component 138 may be configured to query the sensors 123, the user account 136, the user device 102(*b*), and/or other components to acquire some or all of the data types described above. Audible alert selection and/or audible alert characteristic adjustment may be based at least in part on the heuristics and/or rules datasets described above and/or as results from trained machine learning models, as described in more detail herein.

Furthermore, the alert configuration component 138 may be configured to perform processes for prioritizing output of audible alerts on the fly. For example, multiple order status changes and/or other trigger events may occur at or near the same time. Output of multiple audible alerts at the same time may be disadvantageous or otherwise confusing for the users 101(*a*)-(*b*) in the environment. As such, the audible alerts for the multiple trigger events may be prioritized, such as by event type for example, such that the audible alerts are output sequentially based at least in part on a prioritized order of the audible alerts. To illustrate, a first order status change may be that a customer for a first order has included a bottle of wine with the order, while a second order status change may be that a customer has switched to a different entree choice than an original entree choice. While both order status changes may be important, the first order status change may affect users 101(*b*) associated with the kitchen or otherwise cause those users 101(*b*) to respond in a time sensitive manner. As such, the second order status change may be prioritized over the first order status change, and in this example, the audible alert associated with the second order status change may be output before the audible alert associated with the first order status change.

In other examples, prioritization of the audible alerts may result in a given, highly prioritized audible alert being output instead of outputting a less prioritized audible alert. In these examples, unnecessary or otherwise unwanted audible alerts that would otherwise be output may not be output. To illustrate, a first order change associated with a given order may be associated with modification of an item that was ordered, while a second order change also associated with that order may be associated with deletion of the original ordered item (or otherwise the two order changes are associated with each other in some respect). In this example, the audible alert associated with the prioritized order change may be output while the audible alert associated with the less prioritized order change may not be output or may be delayed. In the example where the audible alert is delayed, the alert configuration component 138 may determine an amplitude value of a noise detected in the environment from analysis of audio data from the environment and may determine to delay output of the audible alert until the amplitude value of the noise diminishes to below a threshold amplitude value.

In still other examples, the multiple audible alerts may be output at least in part at the same time. In these examples, the user device and/or the remote system may be configured to select audible alerts that may be harmonized or otherwise combined such that when those audible alerts are output at least partially simultaneously, all of the output audible alerts are still perceptible to the human ear at the same time. Audible alert prioritization and prioritization use may also be based at least in part on results from trained machine learning models, as described in more detail below. In the example where multiple audible alerts are output at the same time, different audible alerts may be selected than if the audible alerts were not to be output simultaneously. For example, a first audible alert for a first order status change may be first synthesized speech and a second audible alert for a second order status change may be second synthesized speech. Output of overlapping synthesized speech may not be desirable. As such, one or more of the audible alerts may be changed to something other than synthesized speech (e.g., a predefined tone and/or chime). In still other examples, a given audible alert may be selected as representing a combination of other audible alerts such that when the given audible alert is output the user in the environment is informed that the given audible alert is for two or more different trigger events.

In addition to selecting an audible alert to be output and/or determining whether to adjust one or more characteristics of the audible alert, the alert configuration component 138 may be configured to intelligently select a speaker 103(*a*)-(*c*) of potentially multiple speakers in the environment to output the audible alert. To select a speaker 103(*a*)-(*c*), the alert configuration component 138 may utilize some or all of the data types described above with respect to selection of the audible alert. Those data types include, for example, the trigger event type, account data associated with the entity, an order status type, ambient sound data corresponding to ambient sound within the environment in question, image data corresponding to images of the environment, sensor data indicating other environmental conditions of the environment including identification of given users in the environment, a venue type associated with the entity, whether multiple alerts are to be output at least partially simultaneously, machine learning results associated with audible alert selection, and the like.

The data types for selecting a speaker 103(*a*)-(*c*) may also include user proximity to various speakers within the environment. For example, image data may be analyzed, utilizing computer vision techniques or otherwise, to identify a user depicted in a field of view of a camera disposed in the environment. That image data may be processed to determine a location of the user in the environment and/or a distance from the user to the camera. Additionally, this image data processing may be utilized to identify the user in question. For example, the computer vision processing may be utilized to identify features of the user depicted in the image data and may compare those identified features to reference features of users as stored in user profiles associated with the entity. The alert configuration component 138 may identify which user profile includes reference features that correspond to or best correspond to the identified features and may select that user profile as the being associated with the depicted user. This information may be utilized to determine which speaker 103(*a*)-(*c*) to output the audible alert on and/or which audible alert to select and/or how to adjust audible alert characteristics. For example, the speaker recognition techniques described above may result in identification of a given user that is associated with the job title of "cook." When the audible alert is about a cook-related trigger event, the speaker 103(*a*)-(*c*) located nearest the user and/or nearest a cooking area of the environment may be selected to output the audible alert. Continuing with the above example, the user profile for the "cook" may indicate that the cook is hearing impaired, visually impaired, and/or has certain attributes that may indicate a certain audible alert should be selected and/or that the audible alert should be adjusted to assist in providing the audible alert to the specific user. In examples, the distance from the user to the device may be utilized to determine a volume to output the audible alert at. In addition to selecting a given speaker to output the audible alert, the alert configuration component 138 may be configured to intelligently determine when to present a visual alert along with the audible alert. This may be based at least in part on the data described above, but by way of example, the alert configuration component 138 may determine that a volume level detected in the environment satisfies a threshold volume level and thus a visual alert is to be provided. Other examples of when a visual alert may be output may include when the alert configuration component 138 detects a certain user in the environment that is associated with a preference for a visual alert, detects a user in front of a display of a POS device, and the like.

The alert component 142, at step 2 in FIG. 1, may be configured to receive data indicating the selected audible alert, the selected audible alert characteristics, the select speaker(s) 103(*a*)-(*c*), and/or any other data described above from the alert configuration component 138. The alert component 142 may utilize this data to retrieve the audio file associated with the selected alert, augment that audio file based at least in part on the audible alert characteristics, and generate a command configured to be utilized by the selected speaker 103(*a*)-(*c*) to output the audible alert. The command may also include metadata that may be utilized by the speaker 103(*a*)-(*c*) to adjust audible alert characteristics, including volume levels for example. It should be understood that the speakers 103(a)-(c) may include the user devices 102(a)-(b).

Additionally, any or all of the operations described above may be performed utilizing one or more of the machine learning models 134. In these examples, the machine learning models 134 may be generated and configured to perform the operations described above, including for example, selecting audible alerts, determining how to alter audible alert characteristics, prioritizing audible alerts, determining when to utilize alternate audible alerts for harmonization or otherwise, selecting speaker(s) 103(a)-(c), determining customization options to display via the user interface 110, and the like. Feedback data on performance of these machine learning models 134 may be received over time and one or more training datasets may be generated based at least in part on that feedback data. The training datasets may be utilized to train the machine learning models 134 such that trained machine learning models 134 are generated. The trained machine learning models 134 may utilize features and/or feature weightings that differ from the original machine learning models 134 prior to training. The trained machine learning models 134 may then be utilized to perform the operations described herein.

By so doing, audible alerts may be selected and improved, and speakers 103(a)-(c) may be intelligently selected, to cause output of audible alerts in an environment in a way that promotes user responses to those audible alerts in a time sensitive and dynamic manner. Doing so may promote a better, quicker customer experience for customers of the entity in question and may promote a better working environment for the user (e.g., the employees) of the entity.

In some implementations, the methods and systems described herein can be integrated with voice services (e.g. Amazon's ALEXA®, Apple's SIRI®, or Microsoft's COR-TANA®) through specific API calls to such services. The present methods and systems can integrate with the "wake words" for invoking their respective voice service, ecommerce and fulfillment channels. For example, speaker recognition techniques may be utilized to determine user profiles associated with users that provide user utterances to user devices for performing one or more of the operations described herein.

Figure 2:
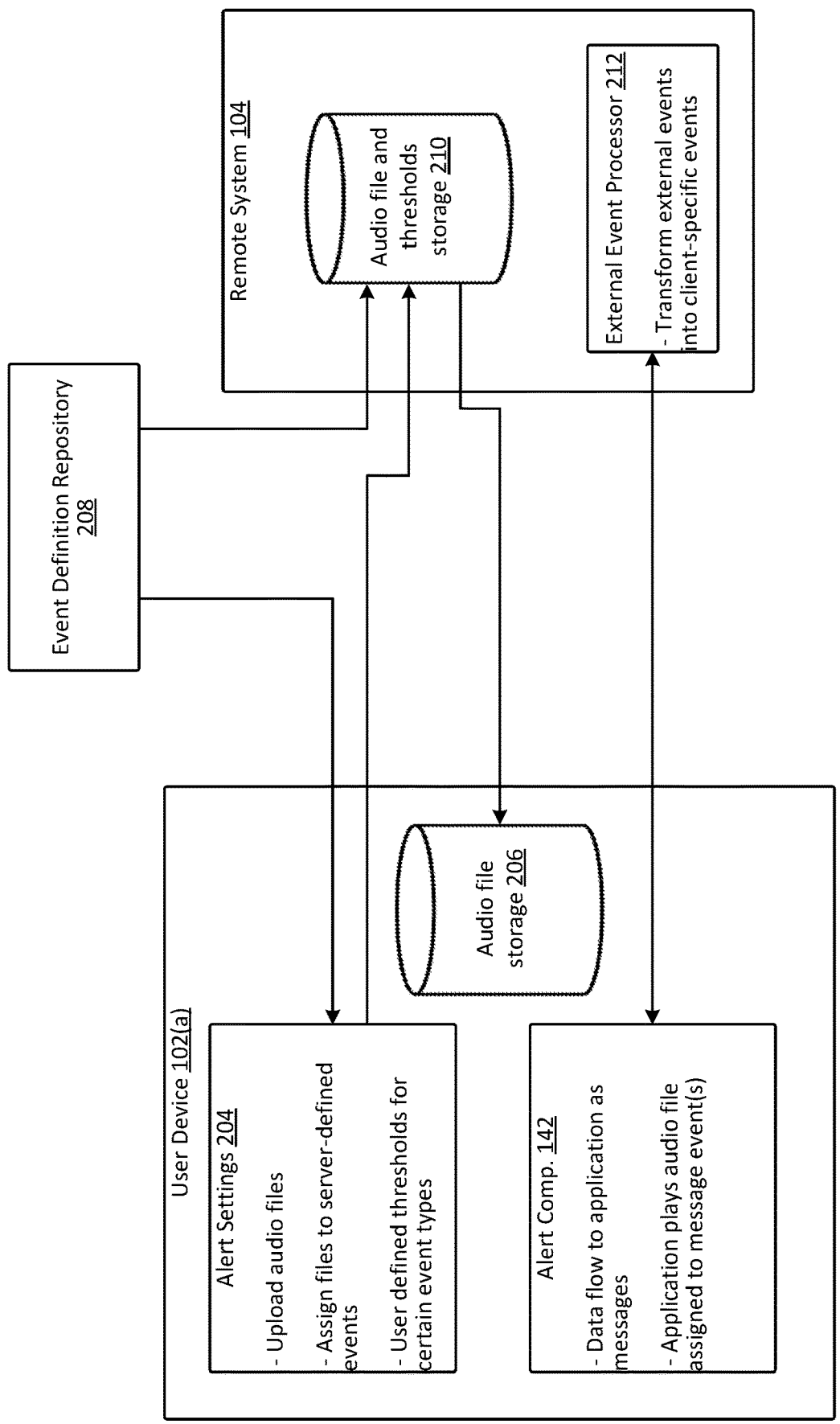
FIG. 2 is a conceptual diagram of example components, devices, and data involved in audio data processing and output improvement, according to an embodiment described herein.

FIG. 2 is a conceptual diagram of example components, devices, and data involved in audio data processing and output improvement, according to an embodiment described herein. The components of FIG. 2 are shown as the user device 102(a), the remote system 104, and other components described below. The user device 102(a) may include the same or similar components as the user device 102(a) described with respect to FIG. 1. The remote system 104 may include the same or similar components as the remote system 104 described with respect to FIG. 1. The operations described as being performed in FIG. 2 may be performed by the user device 102(a) and/or the remote system 104. It should also be understood that while various components and databases are shown in FIG. 2 as being a portion of the user device 102(a) and/or the remote system 104, respectively, any of the components may be associated with the user device 102(a) and/or the remote system 104.

As shown in FIG. 2, an event definition repository 208 may be configured to store event definitions associated with trigger events. The trigger events may be any trigger events described herein, with several examples being provided with respect to FIG. 1, above. The event definitions in the event definition repository 208 may also include data associated with various trigger events, including which audible alerts are associated with which trigger events, which audible alert rules apply to certain trigger events, how audible alert characteristics are to be adjusted, and/or how to select one or more speakers for output of audible alerts. The event definition repository 208 may publish or otherwise send the data stored therein to the user device 102(a) and/or to the remote system 104.

When this data is sent to the user device 102(a), the user device 102(a) may utilize such data to generate alert settings 204. The alert settings may be utilized to determine how to process trigger events when detected by the user device 102(a) and/or the remote system 104. The alert settings 204 may include rules for uploading audio files corresponding to the audible alerts described herein, assigning files to server-defined events such as various trigger events, and setting user-defined thresholds for certain event types. These user-defined thresholds may be based at least in part on user input data received in connection with the user interface 400 described below with respect to FIG. 4. When the data described above is sent to the remote system 104 from the event definition repository 208, the remote system 104 may utilize that data to store audio files and/or various thresholds in an audible file and threshold storage 210.

Additionally, some or all of the data stored in association with the alert settings 204 on the user device 102(a) may be sent to the audio file and thresholds storage 210. By so doing, the remote system 104 may store data that may be utilized for selecting audible alerts, adjusting characteristics of audible alerts, and/or selecting speakers for output of audible alerts. Furthermore, the remote system 104 may send audio files associated with audible alerts to an audio file storage 206 of the user device 102(a) such that the user device 102(a) may have the audio files ready for use without, in examples, communicating with the remote system 104 during a runtime process.

Furthermore, the alert component 142 of the user device 102(a) may send information to and receive information from an external event processor 212 of the remote system 104. For example, the alert component 142 may perform operations such as facilitating data flow to one or more applications running on the user device 102(a) as messages associated with audible alerts. The alert component 142 may also be configured to cause an application to retrieve specific audio files for audible alerts and to utilize the audio files to play audible alerts that are assigned to given message events associated with various trigger events. When the remote system 104 is involved in this process, the external event processor 212 may be configured to transform external events into client-specific events that may be processed for determining how to output audible alerts to a specific client (e.g., a specific entity).

Figure 3:
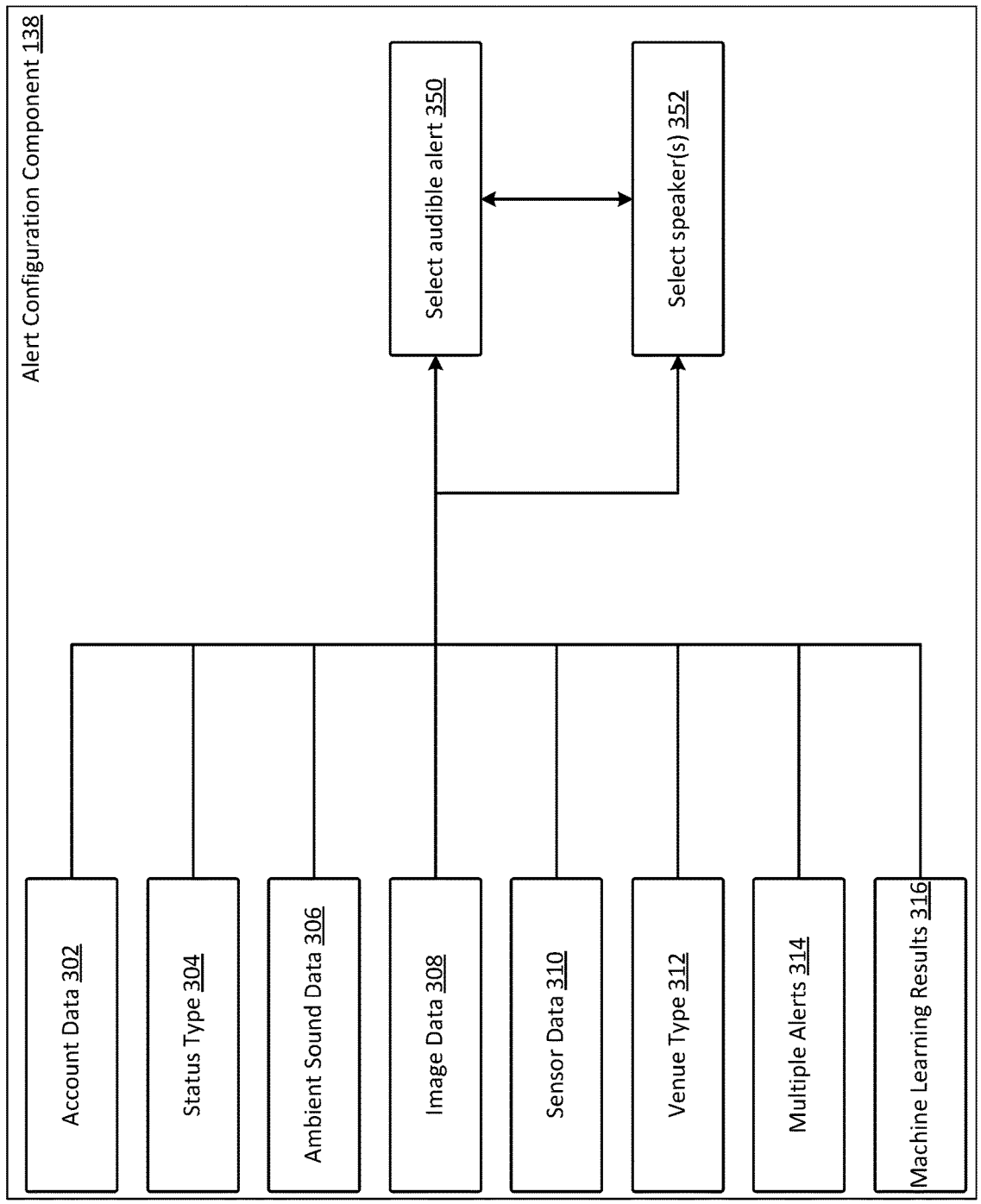
FIG. 3 is a conceptual diagram of example data and an example component that may be utilized to select audible alerts and/or to select a speaker for output of audible alerts, according to an embodiment described herein.

FIG. 3 is a conceptual diagram of example data and an example component that may be utilized to select audible alert and/or to select a speaker for output of audible alerts, according to an embodiment described herein. The data utilized and operations performed in FIG. 3 may associated with the alert configuration component 138 from FIG. 1.

As shown in FIG. 3, one or more data types may be utilized by the alert configuration component 138 to select an audible alert 350 and/or the select one or more speakers 352 for outputting an audible alert. Those data types may include, for example, a trigger event type, account data 302 associated with the entity, an order status type 304, ambient sound data 306 corresponding to ambient sound within the environment in question, image data 308 corresponding to images of the environment, sensor data 310 indicating other environmental conditions of the environment including identification of given users in the environment, a venue type 312 associated with the entity, whether multiple alerts 314 are to be output at least partially simultaneously, machine learning results 316 associated with audible alert selection, and the like.

To illustrate, the account data 302 may indicate that customized or otherwise preferred audible alerts have been selected for the entity at issue. This account data 302 may be utilized to select the customized and/or preferred audible alerts for output on a user device. The status type 304 may indicate details about the trigger event at issue and/or how an order status has changed. Such status types 304 may be predefined to be associated with given audible alerts and/or may be associated with a subset of potential audible alerts. The ambient sound data 306 may include audio data indicating volumes and/or amplitudes of audio received at one or more microphones disposed in the environment in question. The image data 308 may include data corresponding to one or more images and/or video captured by a camera disposed in the environment. The sensor data 310 may include any data received from a sensor, such as one or more of the sensors 123 described with respect to FIG. 1. The venue type 312 may indicate a classification of the venue (or otherwise the environment), including an indicator of a type of entity associated with the environment, item categories for items sold by the entity, and the like. Multiple alerts data 314 may be data indicating that multiple alerts are to be output at least partially simultaneously. The machine learning results 316 may be data indicating output of one or more machine learning models that are configured to select audible alerts and/or to select a speaker to output the audible alerts.

For example, the alert configuration component 138 may be configured to utilize the data types described above to determine which audible alert to select at block 350. In examples, selection of the audible alert may be based on heuristics and/or rules datasets that the alert configuration component 138 is configured to utilize with the data types described above as input. Additionally, or alternatively, a machine learning model, including a trained machine learning model, may be utilized by the alert configuration component 138 to select an audible alert.

The sensors 123 as described herein may be any sensors 123 that are configured to detect environmental conditions of an environment where the user device at issue is disposed and/or detect objects and/or characteristics of objects associated with the environment. Nonlimiting examples of sensors 123 may include, microphones, cameras, temperature sensors, alarm system sensors, wearable devices, mobile devices such as phones, device beacons, and the like.

In addition to selecting the audible alert from potentially multiple audible alerts, the alert configuration component 138 may intelligently determine whether to adjust characteristics of the audible alert such that when the audible alert is output it is improved for the users in the environment to hear and respond to the audible alert. Example, nonlimiting characteristics of the audible alert may include a volume of the alert, a tone of the alert, a cadence of the alert with respect to other alerts, a speed at which the alert is output, a start time for output of the alert, and the like. Audible alert selection and/or audible alert characteristic adjustment may be based at least in part on the heuristics and/or rules datasets described above and/or as results from trained machine learning models, as described in more detail herein.

In still other examples, the multiple audible alerts may be output at least in part the same time. In these examples, the user device and/or the remote system may be configured to select audible alerts that may be harmonized or otherwise combined such that when those audible alerts are output at least partially simultaneously, all of the output audible alerts are still perceptible to the human ear at the same time. Audible alert prioritization and prioritization use may also be based at least in part on results from trained machine learning models, as described in more detail below. In the example where multiple audible alerts are output at the same time, different audible alerts may be selected than if the audible alerts were not to be output simultaneously. For example, a first audible alert for a first order status change may be first synthesized speech and a second audible alert for a second order status change may be second synthesized speech. Output of overlapping synthesized speech may not be desirable. As such, one or more of the audible alerts may be changed to something other than synthesized speech (e.g., a predefined tone and/or chime). In still other examples, a given audible alert may be selected as representing a combination of other audible alerts such that when the given audible alert is output the user in the environment is informed that the given audible alert is for two or more different trigger events.

In addition to selecting an audible alert to be output and/or determining whether to adjust one or more characteristics of the audible alert, the alert configuration component 138 may be configured to intelligently select a speaker of potentially multiple speakers in the environment to output the audible alert, at block 352. To select a speaker, the alert configuration component 138 may utilize some or all of the data types described above with respect to selection of the audible alert. Those data types include, for example, the trigger event type, account data associated with the entity, an order status type, ambient sound data corresponding to ambient sound within the environment in question, image data corresponding to images of the environment, sensor data indicating other environmental conditions of the environment including identification of given users in the environment, a venue type 312 associated with the entity, whether multiple alerts are to be output at least partially simultaneously, machine learning results associated with audible alert selection, and the like.

The data types for selecting a speaker may also include user proximity to various speakers within the environment. For example, image data 308 may be analyzed, utilizing computer vision techniques or otherwise, to identify a user depicted in a field of view of a camera disposed in the environment. That image data 308 may be processed to determine a location of the user in the environment and/or a distance from the user to the camera. Additionally, this image data processing may be utilized to identify the user in question. For example, the computer vision processing may be utilized to identify features of the user depicted in the image data and may compare those identified features to reference features of users as stored in user profiles associated with the entity. The alert configuration component 138 may identify which user profile includes reference features that correspond to or best correspond to the identified features and may select that user profile as the being associated with the depicted user. This information may be utilized to determine which speaker to output the audible alert on and/or which audible alert to select and/or how to adjust audible alert characteristics. For example, the speaker recognition techniques described above may result in identification of a given user that is associated with the job title of "cook." When the audible alert is about a cook-related trigger event, the speaker located nearest the user and/or nearest a cooking area of the environment may be selected to output the audible alert. Continuing with the above example, the user profile for the "cook" may indicate that the cook is hearing impaired, visually impaired, and/or has certain attributes that may indicate a certain audible alert should be selected and/or that the audible alert should be adjusted to assist in providing the audible alert to the specific user. In addition to selecting a given speaker to output the audible alert, the alert configuration component 138 may be configured to intelligently determine when to present a visual alert along with the audible alert. This may be based at least in part on the data described above, but by way of example, the alert configuration component 138 may determine that a volume level detected in the environment satisfies a threshold volume level and thus a visual alert is to be provided. Other examples of when a visual alert may be output may include when the alert configuration component 138 detects a certain user in the environment that is associated with a preference for a visual alert, detects a user in front of a display of a POS device, and the like.

Figure 4:
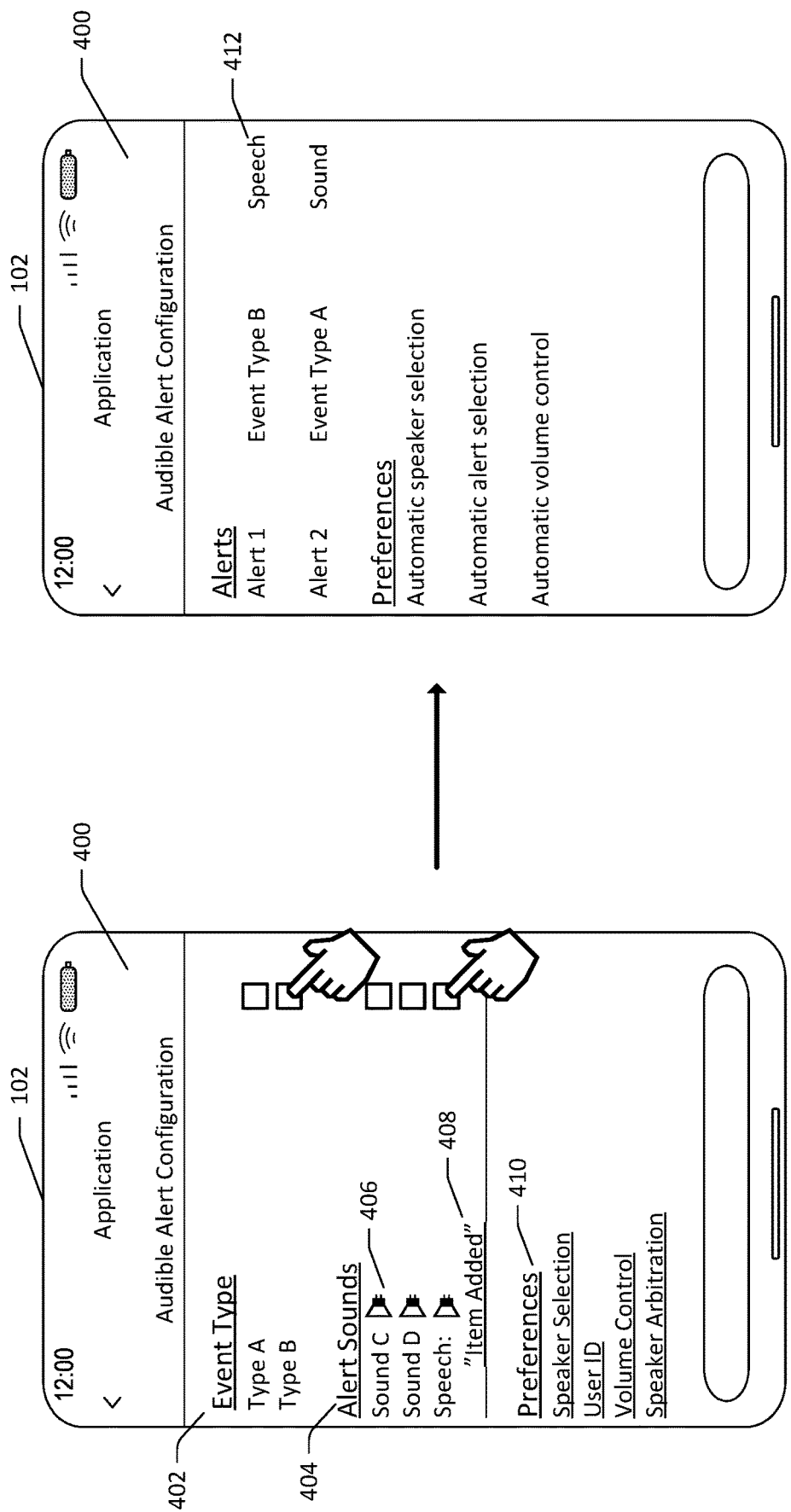
FIG. 4 is an example user interface that may be displayed on a user device with functionality for customizing audible alerts and preferences associated with audible alerts, according to an embodiment described herein.

FIG. 4 is an example user interface 400 that may be displayed on a user device with functionality for customizing audible alerts and preferences associated with audible alerts, according to an embodiment described herein. The user interface 400 may be the same as or similar to the user interface 110 described with respect to FIG. 1. The user interface 400 may be displayed on a user device, such as the user device 102(a)-(b) as described with respect to FIG. 1.

The user interface 400 may be generated and may be configured to present functionality for customizing audible alerts to be output in association with a given entity. As described herein, customizing audible alerts may also be described as adjusting audible alerts. The functionality of the user interface 400 may include options to select event types 402 corresponding to different trigger events, audible alert sounds 404 to select from, the ability to generate customized TTS alerts, and/or the ability to set various preferences, such as speaker selection preferences, user identifier preferences, volume controls, speaker arbitration, and the like. In examples, the entity may utilize the user interface 400 to customize the audible alerts to be output, and audio data (e.g., audio files) may be generated and stored in association with the entity for use in outputting audible alerts as described herein below in more detail. In other examples, particularly in the absence of user input data indicating customization of audible alerts, one or more default audible alerts may be associated with a given entity for output as described herein below in more detail.

With respect to customizing the audible alerts, the event types 402 may include indicators of certain trigger events. In examples, the event types 402 may be selected from a corpus of event types 402 to be displayed. A subset of the event types 402 may be made available for selection based at least in part on any of the data described herein. The alert sounds 304 may be selected from a corpus of alert sounds 404, including sounds that are predefined and provided by the remote system described herein and/or from sounds that were customized and/or recorded with respect to the particular entity at issue. In examples, a venue type associated with the entity may be utilized to determine a subset of event types 402 and/or alert sounds 404 to be made available for selection by the entity. A play icon 406 may also be displayed that, when selected, may cause output of the audible alert such that the user can determine if the audible alert is the desired alert. Additionally, a text input field 408 may be included in the user interface 400 to receive user input data in the form of text. This text data may be utilized to generate synthetic speech utilizing TTS functionality as described herein.

The user interface 400 may also include a preferences portion 410 with various preference categories that may be selectable to adjust preferences to be associated with the entity. These preferences may include, for example, a speaker selection preference where input data may be received to prioritize selection of certain speakers to output audible alerts in the environment in question. The preferences may also include a user identity preference where a user profile may be generated and attributes of a given user may be stored in association with the user profile, such as an image of the user, preferences of the user, abilities and needs of a user, and the like. The preferences may also include a volume control preference which may be based at least in part on input data indicating volume adjustments to be made when audible alerts are output. The preferences may also include speaker arbitration indicators which may be utilized to determine which of several speakers to select for outputting an audible alert when multiple speakers are otherwise available.

Some or all of this functionality may be utilized by a user of the user interface 400 to customize audible alerts. Once user input data is received indicating these customizations, the user interface 400 may transition to displaying the results of the customization. In the example of FIG. 4, the user interface 400 may transition to displaying alert summaries 412. These alert summaries may include an identifier of the alert at issue, an event type associated with that alert, and an indicator of the type of alert (e.g., synthetic speech, predefined sound, etc.). Additionally, the user interface 400 may display the preferences set for the entity at issue. In the example of FIG. 4, these preference may include automatic speaker selection whereby the remote system and/or the user device is configured to intelligently select a speaker, automatic alert selection whereby the remote system and/or the user device is configured to intelligently select an alert, and/or automatic volume control whereby the remote system and/or the user device is configured to intelligently control attributes of the audible alert such as volume levels, for example.

FIGS. 5-8 are example processes for audio data processing and output improvement. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-4 and 9-13, although the processes may be implemented in a wide variety of other environments, architectures and systems.

Figure 5:
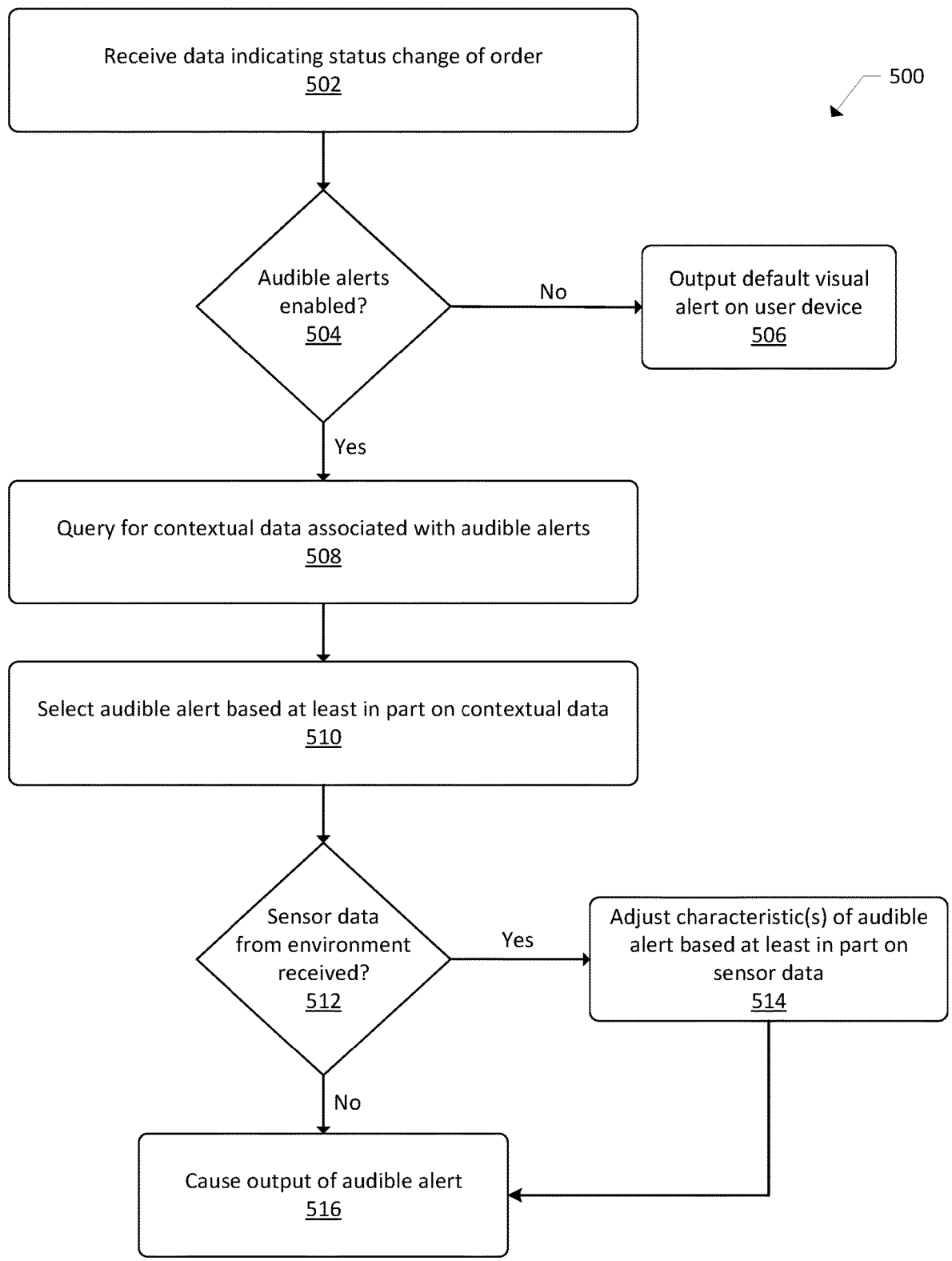
FIG. 5 is a flow diagram of an example process for selecting an audible alert and for determining whether and/or how to adjust characteristics of the audible alert, according to an embodiment described herein.

FIG. 5 is a flow diagram of an example process 500 for selecting an audible alert and for determining whether and/or how to adjust characteristics of the audible alert, according to an embodiment described herein. The order in which the operations or steps are described is not intended to be construed as a limitation, and any number of the described operations may be combined in any order and/or in parallel to implement process 500. The process 500 may be performed utilizing any and/or all of the components described with respect to FIG. 1. The process 500 may be performed utilizing one or more components of the user devices 102(a)-(b) and/or the remote system 104 described with respect to FIG. 1.

At block 502, the process 500 may include receiving data indicating a status change of an order. For example, a user device and/or a remote system associated with the user device may receive data indicating order status changes and/or other trigger events and to process that data to determine whether to output an audible alert. As used herein, an order status change may include any change to a preexisting order associated with the entity at issue. Examples of such order changes include order cancellations, item modifications, removal of items from orders, inclusion of new items in orders, changing of pickup and/or delivery times, changes to customer information, changes to payment instrument information, dietary corrections, customer preference changes, and the like. These order status changes may be examples of trigger events. Other trigger events may include, as nonlimiting examples, wait times exceeding one or more thresholds, other time-related events, customer location changes, and the like. In general, any change to an order and/or circumstances associated with an order may be considered a trigger event that may be associated with an audible alert.

At block 504, the process 500 may include determining whether audible alerts are enabled. For example, the user device and/or the remote system may determine an event type associated with the trigger event and may determine if that event type has been predefined (as a default and/or based on customization by the entity) to be associated with output of an audible alert. For example, as a threshold matter, the user device and/or remote system may determine whether the trigger event in question is associated with an audible alert. For example, some trigger events may not be sufficiently important generally and/or to a specific entity to merit output of an audible alert and thus not all trigger events may be associated with an audible alert.

In examples where audible alerts are not enabled, the process 500 may include, at block 506, outputting a default visual alert on a user device. In this example, the entity at issue may have provided user input data indicating a preference for visual alerts instead of audible alerts. In other examples, output of audible alerts may not have been authorized by the entity and/or an account or otherwise credentials for outputting audible alerts may not have been established. In these examples, when the trigger event indicates that an alert should be output, instead of outputting an audible alert, a command may be sent to the user device at issue that causes the user device to output the visual alert on a display of the user device and/or on another device associated with the entity.

In examples where audible alerts are enabled, the process 500 may include, at block 508, querying one or more data sources for contextual data associated with the audible alerts. For example, the contextual data may include a trigger event type, account data associated with the entity, an order status type, ambient sound data corresponding to ambient sound within the environment in question, image data corresponding to images of the environment, sensor data indicating other environmental conditions of the environment including identification of given users in the environment, a venue type associated with the entity, whether multiple alerts are to be output at least partially simultaneously, machine learning results associated with audible alert selection, and the like.

To illustrate, the account data may indicate that customized or otherwise preferred audible alerts have been selected for the entity at issue. This account data may be utilized to select the customized and/or preferred audible alerts for output on a user device. The status type may indicate details about the trigger event at issue and/or how an order status has changed. Such status types may be predefined to be associated with given audible alerts and/or may be associated with a subset of potential audible alerts. The ambient sound data may include audio data indicating volumes and/or amplitudes of audio received at one or more microphones disposed in the environment in question. The image data may include data corresponding to one or more images and/or video captured by a camera disposed in the environment. The sensor data may include any data received from a sensor, such as one or more of the sensors 123 described with respect to FIG. 1. The venue type may indicate a classification of the venue (or otherwise the environment), including an indicator of a type of entity associated with the environment, item categories for items sold by the entity, and the like. Multiple alerts data may be data indicating that multiple alerts are to be output at least partially simultaneously. The machine learning results may be data indicating output of one or more machine learning models that are configured to select audible alerts and/or to select a speaker to output the audible alerts.

At block 510, the process 500 may include selecting an audible alert based at least in part on the contextual data. For example, selection of the audible alert may be based on heuristics and/or rules datasets that the user device and/or the remote system are configured to utilize with the contextual data described above as input. Additionally, or alternatively, a machine learning model, including a trained machine learning model, may be utilized by the user device and/or the remote system to select an audible alert. The machine learning model may format the contextual data as input to the machine learning model and may be configured to determine factors from the data types that are useful in selecting audible alerts as well as factor weightings to apply.

At block 512, the process 500 may include determining whether sensor data from an environment where the audible alert is to be output has been received. The sensor data may be the contextual data in examples. In other examples, the sensor data may be different from the contextual dat. The sensor data may be received from one or more sensors disposed in an environment where the audible alert is to be output. The sensors as described herein may be any sensors that are configured to detect environmental conditions of an environment where the user device is disposed and/or detect objects and/or characteristics of objects associated with the environment. Nonlimiting examples of sensors may include, microphones, cameras, temperature sensors, alarm system sensors, wearable devices, mobile devices such as phones, device beacons, and the like.

In examples where such sensor data has been received, the process 500 may include, at block 514, adjusting one or more characteristics of the audible alert based at least in part on the sensor data. For example, nonlimiting characteristics of the audible alert may include a volume of the alert, a tone of the alert, a cadence of the alert with respect to other alerts, a speed at which the alert is output, a start time for output of the alert, and the like. The user device and/or the remote system may be configured to query the sensors, the user accounts described herein, other user devices, and/or other components to acquire some or all of the sensor data described above. Audible alert characteristic adjustment may be based at least in part on the heuristics and/or rules datasets described above and/or as results from trained machine learning models, as described in more detail herein.

In examples where such sensor data has not been received, and/or after adjusting the characteristics of the audible alert at block 514, the process 500 may include, at block 516, causing output of the audible alert. For example, the user device and/or the remote system may be configured to receive data indicating the selected audible alert and the selected audible alert characteristics and/or any other data described above. The user device and/or the remote system may utilize this data to retrieve the audio file associated with the selected alert, augment that audio file based at least in part on the audible alert characteristics, and generate a command configured to be utilized by a selected speaker to output the audible alert. The command may also include metadata that may be utilized by the speaker to adjust audible alert characteristics, including volume levels for example.

Figure 6:
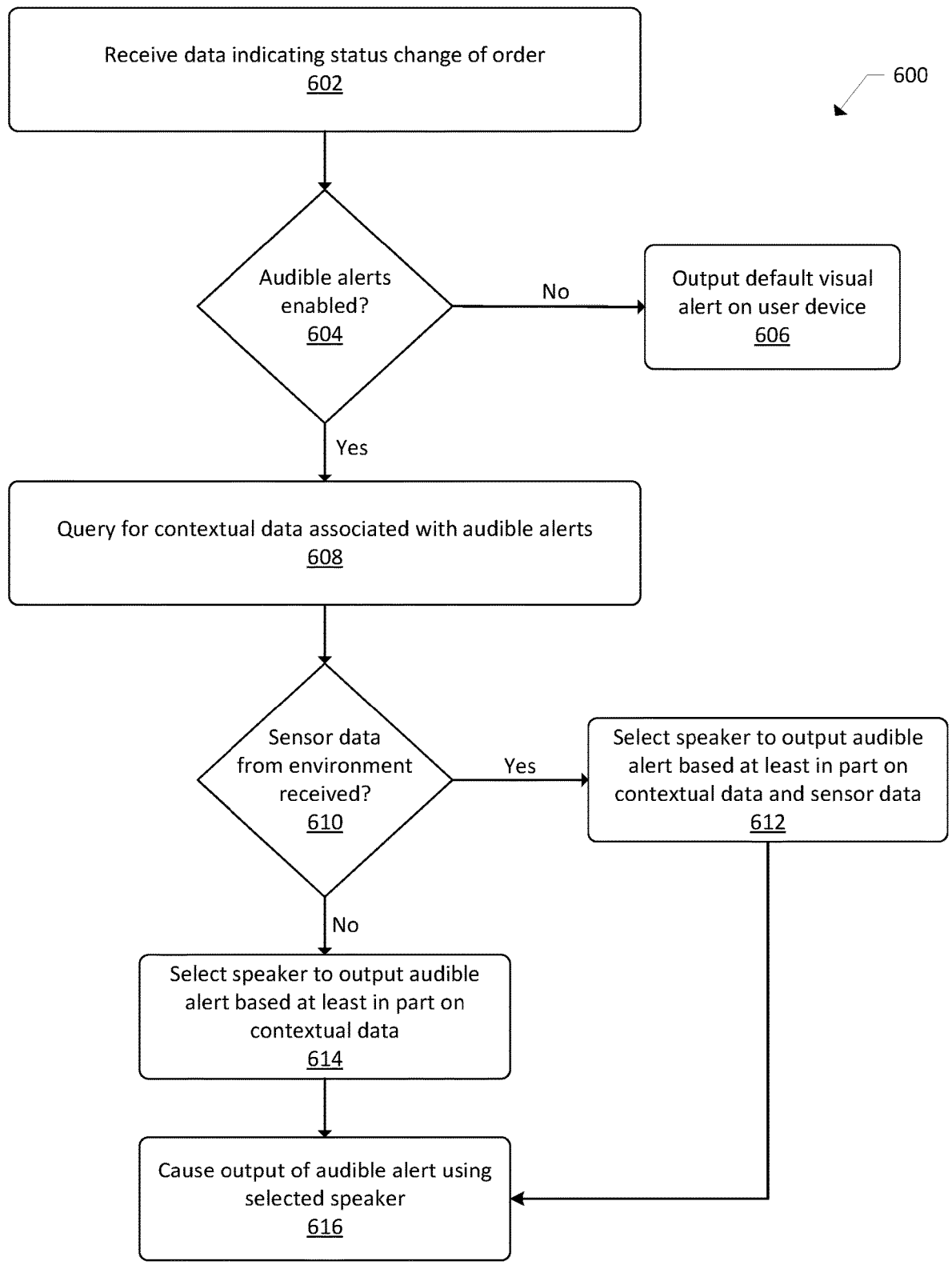
FIG. 6 is a flow diagram of an example process for selecting a speaker for output of an audible alert, according to an embodiment described herein.

FIG. 6 is a flow diagram of an example process 600 for selecting a speaker for output of an audible alert, according to an embodiment described herein. The order in which the operations or steps are described is not intended to be construed as a limitation, and any number of the described operations may be combined in any order and/or in parallel to implement process 600. The process 600 may be performed utilizing any and/or all of the components described with respect to FIG. 1. The process 600 may be performed utilizing one or more components of the user devices 102(*a*)-(*b*) and/or the remote system 104 described with respect to FIG. 1.

At block 602, the process 600 may include receiving data indicating a status change of an order. For example, a user device and/or a remote system associated with the user device may receive data indicating order status changes and/or other trigger events and to process that data to determine whether to output an audible alert. As used herein, an order status change may include any change to a preexisting order associated with the entity at issue. Examples of such order changes include order cancellations, item modifications, removal of items from orders, inclusion of new items in orders, changing of pickup and/or delivery times, changes to customer information, changes to payment instrument information, dietary corrections, customer preference changes, and the like. These order status changes may be examples of trigger events. Other trigger events may include, as nonlimiting examples, wait times exceeding one or more thresholds, other time-related events, customer location changes, and the like. In general, any change to an order and/or circumstances associated with an order may be considered a trigger event that may be associated with an audible alert.

At block 604, the process 600 may include determining whether audible alerts are enabled. For example, the user device and/or the remote system may determine an event type associated with the trigger event and may determine if that event type has been predefined (as a default and/or based on customization by the entity) to be associated with output of an audible alert. For example, as a threshold matter, the user device and/or remote system may determine whether the trigger event in question is associated with an audible alert. For example, some trigger events may not be sufficiently important generally and/or to a specific entity to merit output of an audible alert and thus not all trigger events may be associated with an audible alert.

In examples where audible alerts are not enabled, the process 600 may include, at block 606, outputting a default visual alert on a user device. In this example, the entity at issue may have provided user input data indicating a preference for visual alerts instead of audible alerts. In other examples, output of audible alerts may not have been authorized by the entity and/or an account or otherwise credentials for outputting audible alerts may not have been established. In these examples, when the trigger event indicates that an alert should be output, instead of outputting an audible alert, a command may be sent to the user device at issue that causes the user device to output the visual alert on a display of the user device and/or on another device associated with the entity.

In examples where audible alerts are enabled, the process 600 may include, at block 608, querying one or more data sources for contextual data associated with the audible alerts. For example, the contextual data may include a trigger event type, account data associated with the entity, an order status type, ambient sound data corresponding to ambient sound within the environment in question, image data corresponding to images of the environment, sensor data indicating other environmental conditions of the environment including identification of given users in the environment, a venue type associated with the entity, whether multiple alerts are to be output at least partially simultaneously, machine learning results associated with audible alert selection, and the like.

To illustrate, the account data may indicate that customized or otherwise preferred audible alerts have been selected for the entity at issue. This account data may be utilized to select the customized and/or preferred audible alerts for output on a user device. The status type may indicate details about the trigger event at issue and/or how an order status has changed. Such status types may be predefined to be associated with given audible alerts and/or may be associated with a subset of potential audible alerts. The ambient sound data may include audio data indicating volumes and/or amplitudes of audio received at one or more microphones disposed in the environment in question. The image data may include data corresponding to one or more images and/or video captured by a camera disposed in the environment. The sensor data may include any data received from a sensor, such as one or more of the sensors 123 described with respect to FIG. 1. The venue type may indicate a classification of the venue (or otherwise the environment), including an indicator of a type of entity associated with the environment, item categories for items sold by the entity, and the like. Multiple alerts data may be data indicating that multiple alerts are to be output at least partially simultaneously. The machine learning results may be data indicating output of one or more machine learning models that are configured to select audible alerts and/or to select a speaker to output the audible alerts.

At block 610, the process 600 may include determining whether sensor data from an environment where the audible alert is to be output has been received. The sensor data may be the contextual data in examples. In other examples, the sensor data may be different from the contextual dat. The sensor data may be received from one or more sensors disposed in an environment where the audible alert is to be output. The sensors as described herein may be any sensors that are configured to detect environmental conditions of an environment where the user device is disposed and/or detect objects and/or characteristics of objects associated with the environment. Nonlimiting examples of sensors may include, microphones, cameras, temperature sensors, alarm system sensors, wearable devices, mobile devices such as phones, device beacons, and the like.

In examples where sensor data has been received, the process 600 may include, at block 612, selecting a speaker to output the audible alert based at least in part on the contextual data and/or the sensor data. For example, the user device and/or the remote system may utilize some or all of the data types described above with respect to selection of the audible alert to select a speaker to output the audible alert. Those data types include, for example, the trigger event type, account data associated with the entity, an order status type, ambient sound data corresponding to ambient sound within the environment in question, image data corresponding to images of the environment, sensor data indicating other environmental conditions of the environment including identification of given users in the environment, a venue type associated with the entity, whether multiple alerts are to be output at least partially simultaneously, machine learning results associated with audible alert selection, and the like.

The data types for selecting a speaker may also include user proximity to various speakers within the environment. For example, image data may be analyzed, utilizing computer vision techniques or otherwise, to identify a user depicted in a field of view of a camera disposed in the environment. That image data may be processed to determine a location of the user in the environment and/or a distance from the user to the camera. Additionally, this image data processing may be utilized to identify the user in question. For example, the computer vision processing may be utilized to identify features of the user depicted in the image data and may compare those identified features to reference features of users as stored in user profiles associated with the entity. The user device and/or the remote system may identify which user profile includes reference features that correspond to or best correspond to the identified features and may select that user profile as the being associated with the depicted user. This information may be utilized to determine which speaker to output the audible alert on and/or which audible alert to select and/or how to adjust audible alert characteristics. For example, the speaker recognition techniques described above may result in identification of a given user that is associated with the job title of "cook." When the audible alert is about a cook-related trigger event, the speaker located nearest the user and/or nearest a cooking area of the environment may be selected to output the audible alert. Continuing with the above example, the user profile for the "cook" may indicate that the cook is hearing impaired, visually impaired, and/or has certain attributes that may indicate a certain audible alert should be selected and/or that the audible alert should be adjusted to assist in providing the audible alert to the specific user. In addition to selecting a given speaker to output the audible alert, the user device and/or the remote system may be configured to intelligently determine when to present a visual alert along with the audible alert. This may be based at least in part on the data described above, but by way of example, the user device and/or the remote system may determine that a volume level detected in the environment satisfies a threshold volume level and thus a visual alert is to be provided. Other examples of when a visual alert may be output may include when the user device and/or the remote system detects a certain user in the environment that is associated with a preference for a visual alert, detects a user in front of a display of a POS device, and the like.

In examples where sensor data is not received, the process 600 may include, at block 616, selecting a speaker to output the audible alert based at least in part on the contextual data. In this example, while no sensor data indicating environmental conditions in the environment in question has been received, some or all of the contextual data described above that is not sensor data may still be utilized to select a speaker, as described in more detail with respect to FIG. 1.

At block 616, the process 600 may include causing output of the audible alert using the selected speaker. For example, the user device and/or the remote system may be configured to receive data indicating the selected audible alert and the selected audible alert characteristics and/or any other data described above. The user device and/or the remote system may utilize this data to retrieve the audio file associated with the selected alert, augment that audio file based at least in part on the audible alert characteristics, and generate a command configured to be utilized by a selected speaker to output the audible alert. The command may also include metadata that may be utilized by the speaker to adjust audible alert characteristics, including volume levels for example.

Figure 7:
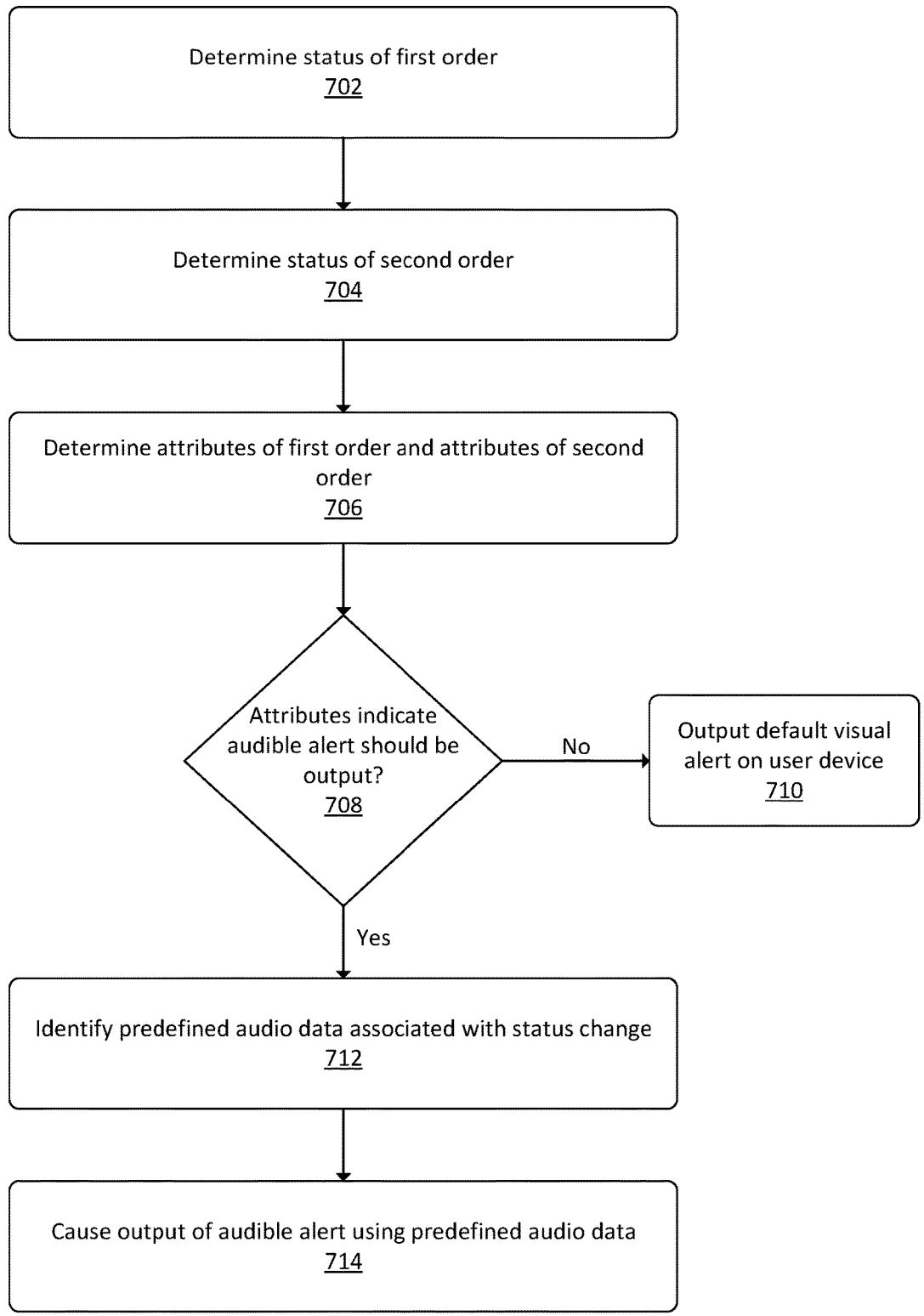
FIG. 7 is a flow diagram of an example process for audio data processing and output improvement, according to an embodiment described herein.

FIG. 7 is a flow diagram of an example process 700 for audio data processing and output improvement, according to an embodiment described herein. The order in which the operations or steps are described is not intended to be construed as a limitation, and any number of the described operations may be combined in any order and/or in parallel to implement process 700. The process 700 may be performed utilizing any and/or all of the components described with respect to FIG. 1. The process 700 may be performed utilizing one or more components of the user devices 102(*a*)-(*b*) and/or the remote system 104 described with respect to FIG. 1.

At block 702, the process 700 may include determining a status of a first order. For example, a user device and/or a remote system associated with the user device may receive data indicating order status changes and/or other trigger events and to process that data to determine whether to output an audible alert. As used herein, an order status change may include any change to a preexisting order associated with the entity at issue. Examples of such order changes include order cancellations, item modifications, removal of items from orders, inclusion of new items in orders, changing of pickup and/or delivery times, changes to customer information, changes to payment instrument information, dietary corrections, customer preference changes, and the like. These order status changes may be examples of trigger events. Other trigger events may include, as nonlimiting examples, wait times exceeding one or more thresholds, other time-related events, customer location changes, and the like. In general, any change to an order and/or circumstances associated with an order may be considered a trigger event that may be associated with an audible alert. In the example of FIG. 7, more than one order may be associated with a given entity at a given time. The first order may be for any item and/or service, and that first order may be associated with a given status, such as an initiated status, a processing status, a completion status, and the like. The user device and/or the remote system may determine the status of the first order based at least in part on user input data received from devices associated with the environment or otherwise. For example, user input data from a server device may be utilized to indicate if the order has been completely taken from a customer. User input data from a preparation area and/or expediting area of a kitchen may indicate a status of preparation of food items. User input data from a cooking area may indicate a status of which food items are cooked and/or are cooking.

At block 704, the process 700 may include determining a status of a second order. Determining the status of the second order may be performed in the same or a similar manner as determining the status of the first order, albeit with respect to the second order instead of the first order. The second order may be associated with the same or a different customer as the first order and/or may be associated with the same or a different environment as the first order.

At block 706, the process 700 may include determining attributes of the first order and attributes of the second order. For example, the attributes of the first order and the attributes of the second order may include any of the data types and/or contextual data described above with respect to FIG. 1. In a nonlimiting example, the attributes may include order types, order status change types, and/or other identifiers of trigger events that may be determined from the first order and/or the second order.

At block 708, the process 700 may include determining whether the attributes indicate an audible alert should be output. For example, the user device and/or the remote system may determine an event type associated with the trigger event and may determine if that event type has been predefined (as a default and/or based on customization by the entity) to be associated with output of an audible alert. For example, as a threshold matter, the user device and/or the remote system may determine whether the trigger event in question is associated with an audible alert. For example, some trigger events may not be sufficiently important generally and/or to a specific entity to merit output of an audible alert and thus not all trigger events may be associated with an audible alert. A user account associated with the entity and/or other data available to the user device and/or the remote system may be queried to determine if a given trigger event type is associated with output of an audible alert for a given circumstance.

In some examples, the specific trigger event at issue may be that a status of a given order has remained unchanged for a threshold period of time (which may be determined by the user device, the remote system, and/or by user preferences associated with the entity at issue). When this occurs, the audible alert may be considered an audible reminder of a previous alert and/or of a current status of the order in question.

In examples where the attributes do not indicate an audible alert should be output, the process 700 may include, at block 710, outputting a default visual alert on a user device. In this example, the entity at issue may have provided user input data indicating a preference for visual alerts instead of audible alerts. In other examples, output of audible alerts may not have been authorized by the entity and/or an account or otherwise credentials for outputting audible alerts may not have been established. In these examples, when the trigger event indicates that an alert should be output, instead of outputting an audible alert, a command may be sent to the user device at issue that causes the user device to output the visual alert on a display of the user device and/or on another device associated with the entity.

In examples where the attributes indicate an audible alert should be output, the process 700 may include, at block 712, identifying predefined audio data associated with a status change of the first order and/or the second order. For example, audible alerts may be customized as described above with respect to FIG. 4 and/or audible alert settings and determinations may be made as described above with respect to FIG. 1. These processes may result in the selection of an audible alert from multiple potential audible alerts and/or in selection of characteristics to apply to output of the selected audible alert and/or in selection of a speaker for output of the audible alert. Once the audible alert is selected, predefined audio data representing the audible alert may be identified, such as from an audible file storage associated with audible alerts and/or with respect to the user account associated with the entity.

At block 714, the process 700 may include causing output of the audible alert using predefined audio data. For example, the user device and/or the remote system may be configured to receive data indicating the selected audible alert and the selected audible alert characteristics and/or any other data described above. The user device and/or the remote system may utilize this data to retrieve the audio file associated with the selected alert, augment that audio file based at least in part on the audible alert characteristics, and generate a command configured to be utilized by a selected speaker to output the audible alert. The command may also include metadata that may be utilized by the speaker to adjust audible alert characteristics, including volume levels for example.

Figure 8:
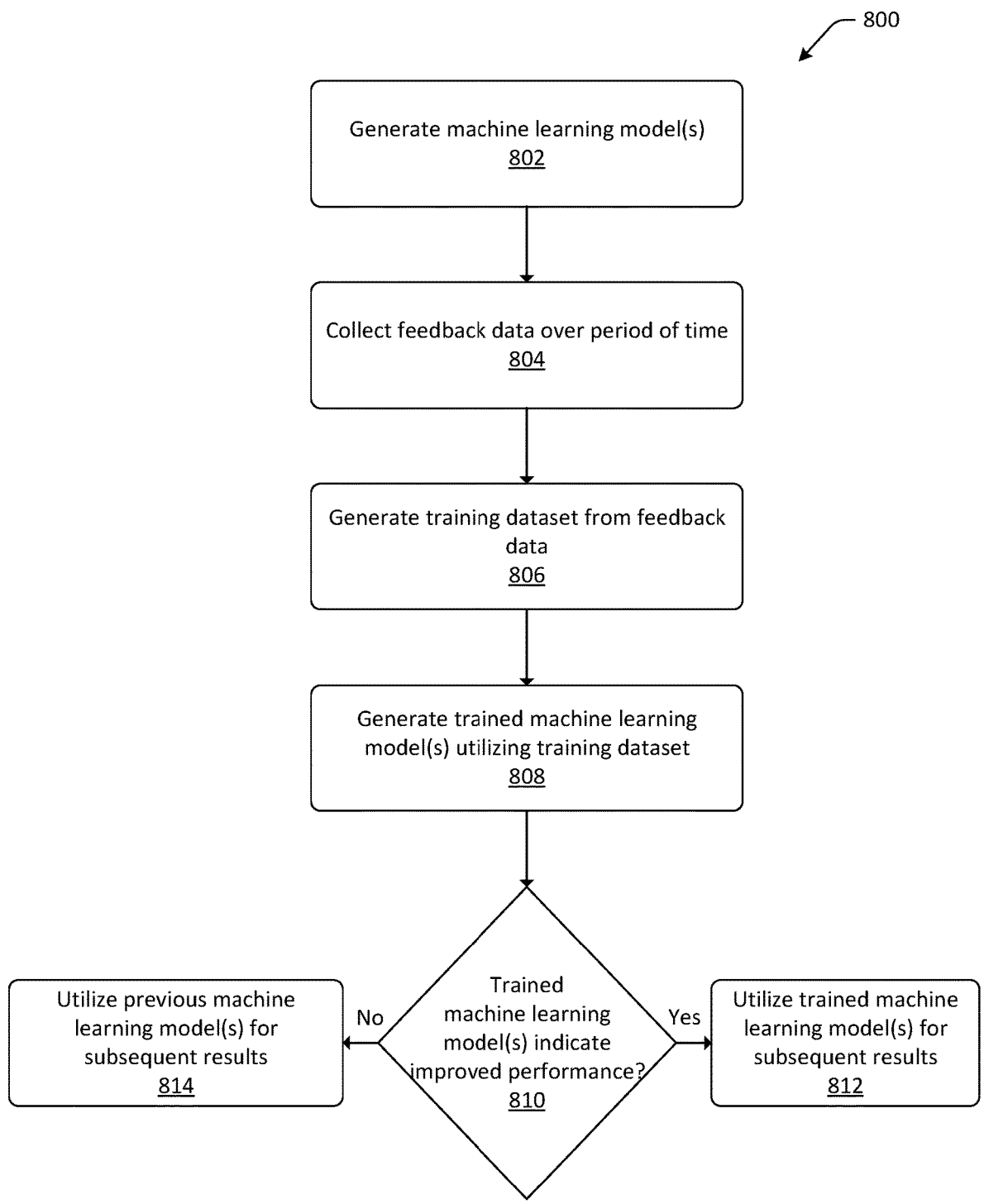
FIG. 8 is a flow diagram of an example process for the generation and utilization of machine learning models to perform one or more operations, accordingly to an embodiment described herein.

FIG. 8 is a flow diagram of an example process 800 for the generation, training, and use of machine learning models associated with dynamic cross-application functionality. The order in which the operations or steps are described is not intended to be construed as a limitation, and any number of the described operations may be combined in any order and/or in parallel to implement process 800. The operations described with respect to FIG. 8 may be performed by the remote system 104 and/or the user device 102(*a*), in examples.

At block 802, the process 800 may include generating one or more machine learning models. For example, the machine learning models may utilize predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the layers and/or models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases, such as the datastore(s) 126, and may be utilized to predict trends and behavior patterns. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter predictive modelling may be performed to generate accurate predictive models.

At block 804, the process 800 may include collecting feedback data over a period of time. The feedback data may include any of the data described with respect to the datastore(s) 126, any data associated with the use of the applications and/or components described herein, any data associated with the data objects described herein, any data described with respect to FIGS. 1-7 and 9-13, or any other data that may be utilized to perform the operations described herein. This information may include factors associated with selecting audible alerts, determining how to alter audible alert characteristics, prioritizing audible alerts, determining when to utilize alternate audible alerts for harmonization or otherwise, selecting speaker(s), determining customization options to display via the user interface described herein, and the like.

At block 806, the process 800 may include generating a training dataset from the feedback data. Generation of the training dataset may include formatting the feedback data into input vectors for the machine learning model to intake, as well as associating the various data with the outcomes of the machine learning models.

At block 808, the process 800 may include generating one or more trained machine learning models utilizing the training dataset. Generation of the trained machine learning models may include updating parameters and/or weightings and/or thresholds utilized by the models to select audible alerts, determine how to alter audible alert characteristics, prioritize audible alerts, determine when to utilize alternate audible alerts for harmonization or otherwise, selecting speaker(s), determine customization options to display via the user interface described herein, and the like. The trained machine learning models may differ from the original machine learning models in that certain additional or different factors may be utilized by the trained machine learning models, certain weighting of factors may be different than those utilized by the original machine learning models, etc.

At block 810, the process 800 may include determining whether the trained machine learning models indicate improved performance metrics. For example, a testing group may be generated where the outcomes of the processes described herein are known but not to the trained machine learning models. The trained machine learning models may generate results, which may be compared to the known results to determine whether the results of the trained machine learning model produce a superior result than the results of the machine learning model prior to training. For example, performance metrics may be generated associated with selecting audible alerts, determining how to alter audible alert characteristics, prioritizing audible alerts, determining when to utilize alternate audible alerts for harmonization or otherwise, selecting speaker(s), determining customization options to display via the user interface described herein, and the like.

In examples where the trained machine learning models indicate improved performance metrics, the process 800 may include, at block 812, utilizing the trained machine learning models for generating subsequent results. For example, the trained machine learning models may be utilized to select audible alerts, determine how to alter audible alert characteristics, prioritize audible alerts, determine when to utilize alternate audible alerts for harmonization or otherwise, select speaker(s), determine customization options to display via the user interface described herein, and the like.

In examples where the trained machine learning models do not indicate improved performance metrics, the process 800 may include, at block 814, utilizing the previous iteration of the machine learning models for generating subsequent results.

Figure 9:
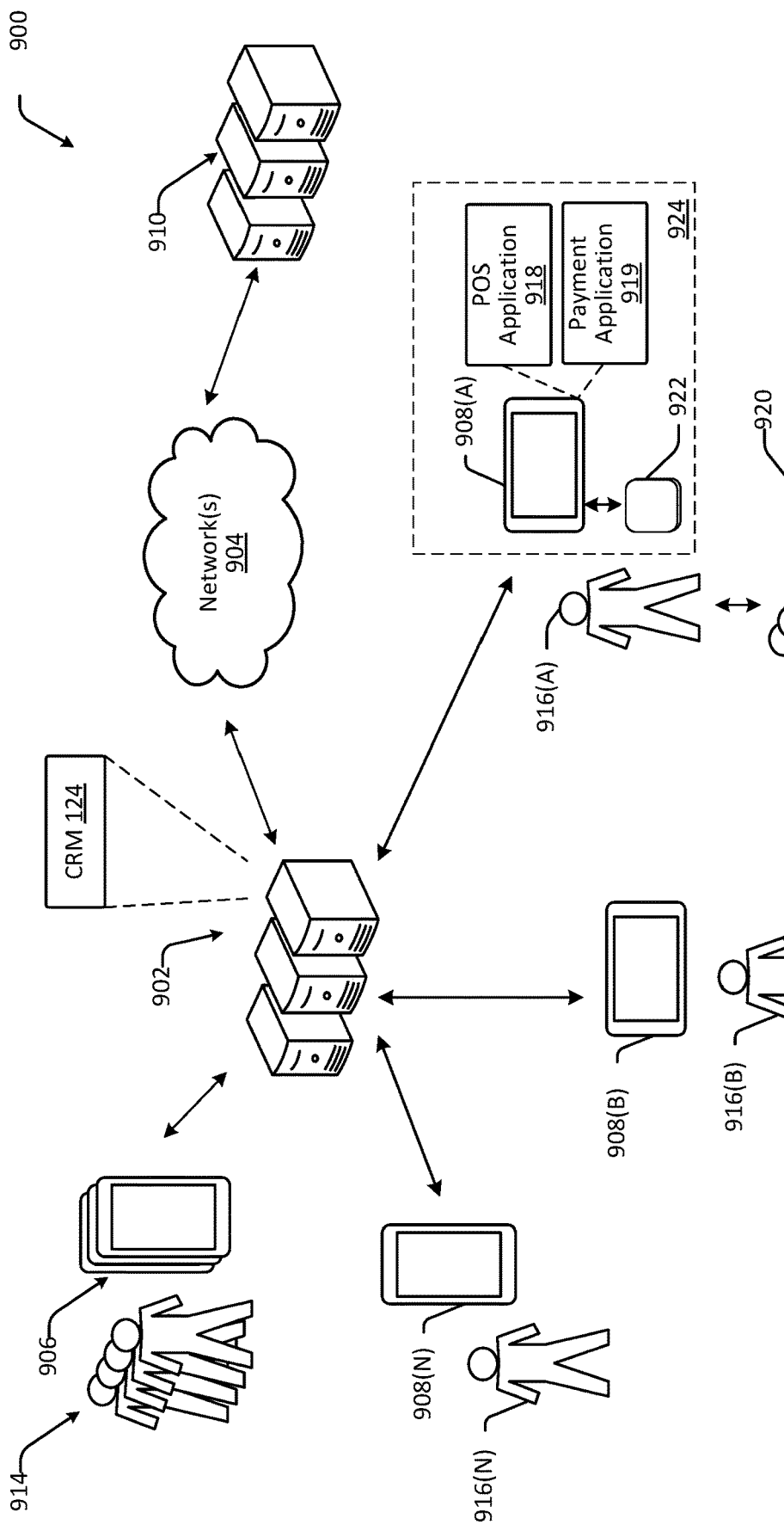
FIG. 9 is an example environment with user devices, merchant devices, a payment service, and/or other systems that may be involved in a transaction, such as by utilizing the payment application as configured herein, according to an embodiment described herein.

FIG. 9 is an example environment with user devices, merchant devices, a payment service, and/or other systems that may be involved in a transaction, such as by utilizing the payment application as configured herein, according to an embodiment described herein. The environment 900 includes server(s) 902 that can communicate over a network 904 with user devices 906 (which, in some examples can be merchant devices 908 (individually, 908(A)-908(N))) and/or server(s) 910 associated with third-party service provider(s). The server(s) 902 can be associated with a service provider that can provide one or more services for the benefit of users 914, as described below. Actions attributed to the service provider can be performed by the server(s) 902. In examples, the server(s) 902 may be the same as or similar to the payment processing service 104 from FIG. 1, which may include the same or similar components of the CRM 124 as described with respect to the payment processing service 104 of FIG. 1

The environment 900 can include a plurality of user devices 906, as described above. Each one of the plurality of user devices 906 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 914. The users 914 can be referred to as customers, buyers, merchants, sellers, borrowers, employees, employers, payors, payees, couriers and so on. The users 914 can interact with the user devices 906 via user interfaces presented via the user devices 906. In at least one example, a user interface can be presented via a web browser, or the like. In some implementations, a user interface can be presented via an application, such as a mobile application or application, which can be provided by the service provider or which can be an otherwise dedicated application. In some examples, individual of the user devices 906 can have an instance or versioned instance of an application, which can be downloaded from an application store, for example, which can present the user interface(s) described herein. In at least one example, a user 914 can interact with the user interface via touch input, spoken input, or any other type of input.

As described above, in at least one example, the users 914 can include merchants 916 (individually, 916(A)-916(N)). In an example, the merchants 916 can operate respective merchant devices 908, which can be user devices 906 configured for use by merchants 916. For the purpose of this discussion, a "merchant" can be any entity that offers items (e.g., goods or services) for purchase or other means of acquisition (e.g., rent, borrow, barter, etc.). The merchants 916 can offer items for purchase or other means of acquisition via brick-and-mortar stores, mobile stores (e.g., pop-up shops, food trucks, etc.), online stores, combinations of the foregoing, and so forth. In some examples, at least some of the merchants 916 can be associated with a same entity but can have different merchant locations and/or can have franchise/franchisee relationships. In additional or alternative examples, the merchants 916 can be different merchants. That is, in at least one example, the merchant 916(A) is a different merchant than the merchant 916(B) and/or the merchant 916(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 908 can have an instance of a POS application 918 stored thereon. The POS application 918 can configure the merchant device 908 as a POS terminal, which enables the merchant 916(A) to interact with one or more customers 920. As described above, the users 914 can include customers, such as the customers 920 shown as interacting with the merchant 916(A). For the purpose of this discussion, a "customer" can be any entity that acquires items from merchants. While only two customers 920 are illustrated in FIG. 9, any number of customers 920 can interact with the merchants 916. Further, while FIG. 9 illustrates the customers 920 interacting with the merchant 916(A), the customers 920 can interact with any of the merchants 916.

In at least one example, interactions between the customers 920 and the merchants 916 that involve the exchange of funds (from the customers 920) for items (from the merchants 916) can be referred to as "transactions." In at least one example, the POS application 918 can determine transaction data associated with the POS transactions. Transaction data can include payment information, which can be obtained from a reader device 922 associated with the merchant device 908(A), user authentication data, purchase amount information, point-of-purchase information (e.g., item(s) purchased, date of purchase, time of purchase, etc.), etc. The POS application 918 can send transaction data to the server(s) 902 such that the server(s) 902 can track transactions of the customers 920, merchants 916, and/or any of the users 914 over time. Furthermore, the POS application 918 can present a UI to enable the merchant 916(A) to interact with the POS application 918 and/or the service provider via the POS application 918.

In at least one example, the merchant device 908(A) can be a special-purpose computing device configured as a POS terminal (via the execution of the POS application 918). In at least one example, the POS terminal may be connected to a reader device 922, which is capable of accepting a variety of payment instruments, such as credit cards, debit cards, gift cards, short-range communication based payment instruments, and the like, as described below. In at least one example, the reader device 922 can plug in to a port in the merchant device 908(A), such as a microphone port, a headphone port, an audio-jack, a data port, or other suitable port. In additional or alternative examples, the reader device 922 can be coupled to the merchant device 908(A) via another wired or wireless connection, such as via a Bluetooth®, BLE, and so on. In some examples, the reader device 922 can read information from alternative payment instruments including, but not limited to, wristbands and the like.

In some examples, the reader device 922 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 922, and communicate with the server(s) 902, which can provide, among other services, a payment processing service. The server(s) 902 associated with the service provider can communicate with server(s) 910, as described below. In this manner, the POS terminal and reader device 922 may collectively process transaction(s) between the merchants 916 and customers 920. In some examples, POS terminals and reader devices can be configured in one-to-one pairings. In some implementations, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In some implementations, such data synchronization may happen periodically or at randomly selected time intervals.

While the POS terminal and the reader device 922 of the POS system 924 are shown as separate devices, in additional or alternative examples, the POS terminal and the reader device 922 can be part of a single device. In some examples, the reader device 922 can have a display integrated therein for presenting information to the customers 920. In additional or alternative examples, the POS terminal can have a display integrated therein for presenting information to the customers 920. POS systems, such as the POS system 924, may be mobile, such that POS terminals and reader devices may process transactions in disparate locations across the world. POS systems can be used for processing card-present transactions and card-not-present (CNP) transactions, as described below.

A card-present transaction is a transaction where both a customer 920 and his or her payment instrument are physically present at the time of the transaction. Card-present transactions may be processed by swipes, dips, taps, or any other interaction between a physical payment instrument (e.g., a card), or otherwise present payment instrument, and a reader device 922 whereby the reader device 922 is able to obtain payment data from the payment instrument. A swipe is a card-present transaction where a customer 920 slides a card, or other payment instrument, having a magnetic strip through a reader device 922 that captures payment data contained in the magnetic strip. A dip is a card-present transaction where a customer 920 inserts a payment instrument having an embedded microchip (i.e., chip) into a reader device 922 first. The dipped payment instrument remains in the payment reader until the reader device 922 prompts the customer 920 to remove the card, or other payment instrument. While the payment instrument is in the reader device 922, the microchip can create a one-time code which is sent from the POS system 924 to the server(s) 910 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 920 may tap or hover his or her payment instrument (e.g., card, electronic device such as a smart phone running a payment application, etc.) over a reader device 922 to complete a transaction via short-range communication (e.g., NFC, RFID, Bluetooth®, BLE, etc.). Short-range communication enables the payment instrument to exchange information with the reader device 922. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 924, the server(s) 902, and/or the server(s) 910 may exchange payment information and transaction data to determine whether transactions are authorized. For example, the POS system 924 may provide encrypted payment data, user authentication data, purchase amount information, point-of-purchase information, etc. (collectively, transaction data) to server(s) 902 over the network(s) 904. The server(s) 902 may send the transaction data to the server(s) 910. As described above, in at least one example, the server(s) 910 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 910 associated therewith) can send a fund transfer request to a server computing device of a card payment network (e.g., Mastercard®, VISA®, etc.) to determine whether the transaction is authorized or deficient. In at least one example, the service provider can serve as an acquirer and connect directly with the card payment network.

The card payment network (e.g., the server(s) 910 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 910 associated therewith) can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 910 associated therewith), and a payment authorization message is communicated from the issuer to the POS device via a path opposite of that described above, or via an alternate path.

As described above, the server(s) 910, which can be associated with payment service provider(s), may determine whether the transaction is authorized based on the transaction data, as well as information relating to parties to the transaction (e.g., the customer 920 and/or the merchant 916(A)). The server(s) 910 may send an authorization notification over the network(s) 904 to the server(s) 902, which may send the authorization notification to the POS system 924 over the network(s) 904 to indicate whether the transaction is authorized. The server(s) 902 may also transmit additional information such as transaction identifiers to the POS system 924. In one example, the server(s) 902 may include a merchant application and/or other functional components for communicating with the POS system 924 and/or the server(s) 910 to authorize or decline transactions.

Based on the authentication notification that is received by the POS system 924 from server(s) 902, the merchant 916(A) may indicate to the customer 920 whether the transaction has been approved. In some examples, approval may be indicated at the POS system 924, for example, at a display of the POS system 924. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 914 can access all of the services of the service provider. In other examples, the users 914 can have gradated access to the services, which can be based on risk tolerance, IDV outputs, subscriptions, and so on. In at least one example, access to such services can be availed to the merchants 916 via the POS application 918. In additional or alternative examples, each service can be associated with its own access point (e.g., application, web browser, etc.).

The service provider can offer payment processing services for processing payments on behalf of the merchants 916, as described above. For example, the service provider can provision payment processing software, payment processing hardware and/or payment processing services to merchants 916, as described above, to enable the merchants 916 to receive payments from the customers 920 when conducting POS transactions with the customers 920. For instance, the service provider can enable the merchants 916 to receive cash payments, payment card payments, and/or electronic payments from customers 920 for POS transactions and the service provider can process transactions on behalf of the merchants 916.

As the service provider processes transactions on behalf of the merchants 916, the service provider can maintain accounts or balances for the merchants 916 in one or more ledgers. For example, the service provider can analyze transaction data received for a transaction to determine an amount of funds owed to a merchant 916(A) for the transaction. In at least one example, such an amount can be a total purchase price less fees charged by the service provider for providing the payment processing services. Based on determining the amount of funds owed to the merchant 916(A), the service provider can deposit funds into an account of the merchant 916(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 916(A) to a bank account of the merchant 916(A) that is held at a bank or other financial institution (e.g., associated with the server(s) 910). Scheduled deposits can occur at a prearranged time after a POS transaction is funded, which can be a business day after the POS transaction occurred, or sooner or later. In some examples, the merchant 916(A) can access funds prior to a scheduled deposit. For instance, the merchant 916(A) may have access to same-day deposits (e.g., wherein the service provider deposits funds from the stored balance to a linked bank account of the merchant on a same day as POS transaction, in some examples prior to the POS transaction being funded) or instant deposits (e.g., wherein the service provider deposits funds from the stored balance to a linked bank account of the merchant on demand, such as responsive to a request). Further, in at least one example, the merchant 916(A) can have a payment instrument that is linked to the stored balance that enables the merchant to access the funds without first transferring the funds from the account managed by the service provider to the bank account of the merchant 916(A).

In at least one example, the service provider may provide inventory management services. That is, the service provider may provide inventory tracking and reporting. Inventory management services may enable the merchant 916(A) to access and manage a database storing data associated with a quantity of each item that the merchant 916(A) has available (i.e., an inventory). Furthermore, in at least one example, the service provider can provide catalog management services to enable the merchant 916(A) to maintain a catalog, which can be a database storing data associated with items that the merchant 916(A) has available for acquisition (i.e., catalog management services). In at least one example, the catalog may include a plurality of data items and a data item of the plurality of data items may represent an item that the merchant 916(A) has available for acquisition. The service provider can offer recommendations related to pricing of the items, placement of items on the catalog, and multi-party fulfilment of the inventory.

In at least one example, the service provider can provide business banking services, which allow the merchant 916(A) to track deposits (from payment processing and/or other sources of funds) into an account of the merchant 916(A), payroll payments from the account (e.g., payments to employees of the merchant 916(A)), payments to other merchants (e.g., business-to-business) directly from the account or from a linked debit card, withdrawals made via scheduled deposit and/or instant deposit, etc. Furthermore, the business banking services can enable the merchant 916(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 916 to visualize their cash flow to track their financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 916. The service provider can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products. For example, in one implementation, the server provider 912 associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider can provide web-development services, which enable users 914 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 916. In at least one example, the service provider can recommend and/or generate content items to supplement omni-channel presences of the merchants 916. That is, if a merchant of the merchants 916 has a web page, the service provider—via the web-development or other services—can recommend and/or generate additional content items to be presented via other channel(s), such as social media, email, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider.

Moreover, in at least one example, the service provider can provide employee management services for managing schedules of employees. Further, the service provider can provide appointment services for enabling users 914 to set schedules for scheduling appointments and/or users 914 to schedule appointments.

In some examples, the service provider can provide restaurant management services to enable users 914 to make and/or manage reservations, to monitor front-of-house and/or back-of-house operations, and so on. In such examples, the merchant device(s) 908 and/or server(s) 902 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfilment services, which can use couriers for delivery, wherein couriers can travel between multiple locations to provide delivery services, photography services, etc. Couriers can be users 914 who can travel between locations to perform services for a requesting user 914 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 906.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the platform of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider can enable conversational commerce via conversational commerce services, which can use one or more machine learning mechanisms to analyze messages exchanged between two or more users 914, voice inputs into a virtual assistant or the like, to determine intents of user(s) 914. In some examples, the service provider can utilize determined intents to automate customer service, offer promotions, provide recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 914 may be new to the service provider such that the user 914 that has not registered (e.g., subscribed to receive access to one or more services offered by the service provider) with the service provider. The service provider can offer onboarding services for registering a potential user 914 with the service provider. In some examples, onboarding can involve presenting various questions, prompts, and the like to a potential user 914 to obtain information that can be used to generate a profile for the potential user 914. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 914 providing all necessary information, the potential user 914 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server(s) 910). That is, the service provider can offer IDV services to verify the identity of users 914 seeking to use or using their services. Identity verification requires a customer (or potential customer) to provide information that is used by compliance departments to prove that the information is associated with an identity of a real person or entity. In at least one example, the service provider can perform services for determining whether identifying information provided by a user 914 accurately identifies the customer (or potential customer) (i.e., Is the customer who they say they are?).

The service provider is capable of providing additional or alternative services and the services described above are offered as a sampling of services. In at least one example, the service provider can exchange data with the server(s) 910 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 902) and/or the server(s) 910 via the network(s) 904. In some examples, the merchant device(s) 908 are not capable of connecting with the service provider (e.g., the server(s) 902) and/or the server(s) 910, due to a network connectivity issue, for example. In additional or alternative examples, the server(s) 902 are not capable of communicating with the server(s) 910 due to network connectivity issue, for example. In such examples, devices may operate in "offline" mode where at least some payment data is stored (e.g., on the merchant device(s) 908) and/or the server(s) 902 until connectivity is restored and the payment data can be transmitted to the server(s) 902 and/or the server(s) 910 for processing.

In at least one example, the service provider can be associated with a hub, such as an order hub, an inventory hub, a fulfillment hub and so on, which can enable integration with one or more additional service providers (e.g., associated with the additional server(s) 910). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 906 that are in communication with one or more server computing devices 902 of the service provider. That is, techniques described herein are directed to a specific implementation—or, a practical application—of utilizing a distributed system of user devices 906 that are in communication with one or more server computing devices 902 of the service provider to perform a variety of services, as described above. The unconventional configuration of the distributed system described herein enables the server(s) 902 that are remotely-located from end-users (e.g., users 914) to intelligently offer services based on aggregated data associated with the end-users, such as the users 914 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 914 and user devices 906. Furthermore, such features are changed dynamically based on the profiles of the users involved interacting with the GUIs. As such, techniques described herein are directed to improvements to computing systems.

Figure 10:
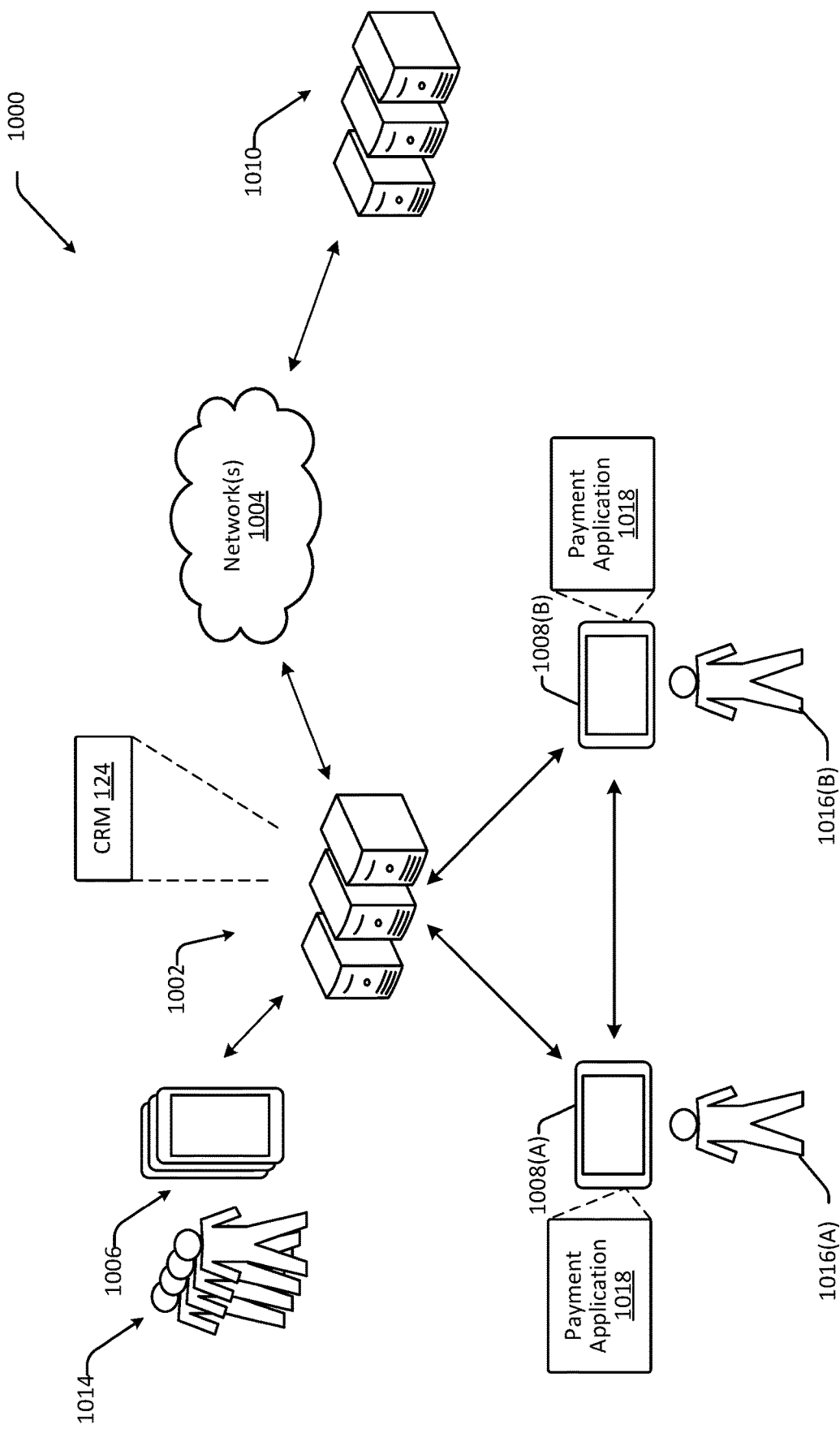
FIG. 10 is an example environment illustrating usage of the payment application, such as described herein, according to an embodiment described herein.

FIG. 10 is an example environment illustrating usage of the payment application, according to an embodiment described herein. The environment 1000 includes server(s) 1002 that can communicate over a network 1004 with user devices 1006 (which, in some examples can be user devices 1008 (individually, 1008(A), 1008(B)) and/or server(s) 1010 associated with third-party service provider(s). The server(s) 1002 can be associated with a service provider that can provide one or more services for the benefit of users 1014, as described below. Actions attributed to the service provider can be performed by the server(s) 1002. In some examples, the service provider referenced in FIG. 9 can be the same or different than the service provider referenced in FIG. 10. As described herein, the server(s) 1002 may be the same or similar to the payment processing service 104 described with respect to FIG. 1, which may include the same or similar components of the CRM 124 as described with respect to the payment processing service 104 of FIG. 1.

The environment 1000 can include a plurality of user devices 1006, as described above. Each one of the plurality of user devices 1006 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1014. The users 1014 can be referred to as customers, buyers, merchants, sellers, borrowers, employees, employers, payors, payees, couriers and so on. The users 1014 can interact with the user devices 1006 via user interfaces presented via the user devices 1006. In at least one example, a user interface can be presented via a web browser, or the like. In other examples, a user interface can be presented via an application, such as a mobile application or application, which can be provided by the service provider or which can be an otherwise dedicated application. In some examples, individual of the user devices 1006 can have an instance or versioned instance of an application, which can be downloaded from an application store, for example, which can present the user interface(s) described herein. In at least one example, a user 1014 can interact with the user interface via touch input, spoken input, or any other type of input.

In at least one example, the service provider can provide a peer-to-peer payment service that enables peer-to-peer payments between two or more users 1014. Two users, user 1016(A) and user 1016(B) are illustrated in FIG. 10 as "peers" in a peer-to-peer payment. In at least one example, the service provider can communicate with instances of a payment application 1018 (or other access point) installed on devices 1006 configured for operation by users 1014. In an example, an instance of the payment application 1018 executing on a first device 1008(A) operated by a payor (e.g., user 1016(A)) can send a request to the service provider to transfer an asset (e.g., fiat currency, non-fiat currency, cryptocurrency, securities, gift cards, and/or related assets) from the payor to a payee (e.g., user 1016(B)) via a peer-to-peer payment. In some examples, assets associated with an account of the payor are transferred to an account of the payee. In some examples, assets can be held at least temporarily in an account of the service provider prior to transferring the assets to the account of the payee.

Figure 11:
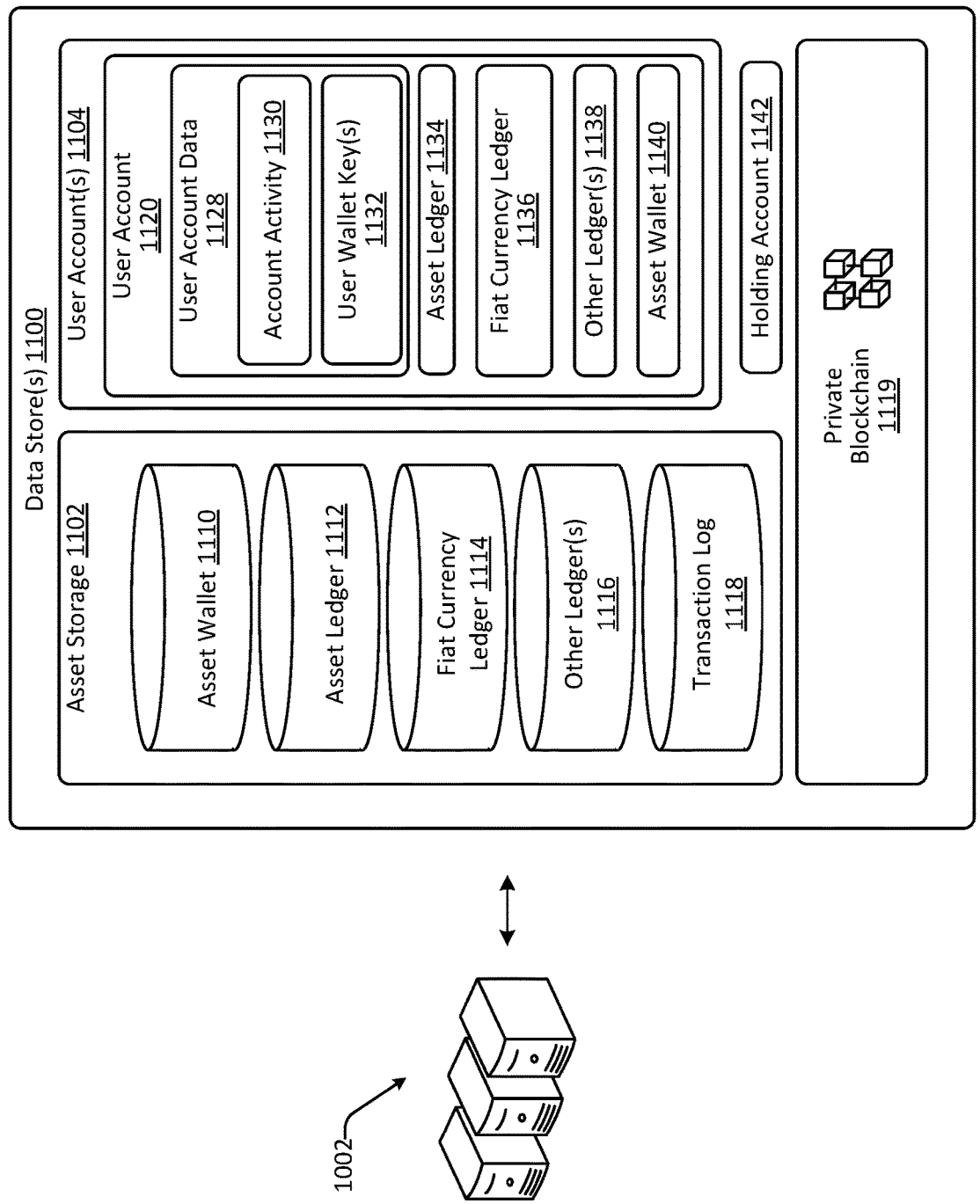
FIG. 11 is an example of datastore(s) that can be associated with servers of the payment service, according to an embodiment described herein.

In some examples, the service provider can utilize a ledger system to track transfers of assets between users 1006. FIG. 11, below, provides additional details associated with such a ledger system. The ledger system can enable users 1006 to own fractional shares of assets that are not conventionally available. For instance, a user can own a fraction of a Bitcoin or a stock. Additional details are described herein.

In at least one example, the service provider can facilitate transfers and can send notifications related thereto to instances of the payment application 1018 executing on user device(s) of payee(s). As an example, the service provider can transfer assets from an account of user 1016(A) to an account of the user 1016(B) and can send a notification to the user device 1008(B) of the user 1016(B) for presentation via a user interface. The notification can indicate that a transfer is in process, a transfer is complete, or the like. In some examples, the service provider can send additional or alternative information to the instances of the payment application 1018 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the service provider funds the request to payee on behalf of the payor, to speed up the transfer process and compensate for any lags that may be attributed to the payor's financial network.

In some examples, the service provider can trigger the peer-to-peer payment process through identification of a "payment proxy" having a particular syntax. For example, the syntax can include a monetary currency indicator prefixing one or more alphanumeric characters (e.g., $Cash). The currency indicator operates as the tagging mechanism that indicates to the server(s) 1002 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, and/or the like can be used to trigger and/or identify users of a peer-to-peer payment process.

In some examples, the peer-to-peer payment process can be initiated through instances of the payment application 1018 executing on the user devices 1006. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/$Cash.

In some examples, the peer-to-peer payment process can be implemented within a forum. The term "forum," as used here, refers to a given platform (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider referenced in FIG. 10. For instance, the service provider can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1006 (e.g., mobile device or conventional personal computer (PC)) based on instructions transmitted to and from the server(s) 1002 (which, in such an example can be called a "messaging server"). In some instances, the messaging application can include a payment application with messaging capability that enables users of the payment application to communicate with one another. In such instances, the payment application can be executed on a user device 1006 based on instructions transmitted to and from the server(s) 1002 (e.g., the payment service discussed in this description or another payment service that supports payment transactions). In some examples, the messaging application can be provided by a third-party service provider associated with the server(s) 1010. In examples where the messaging application is a third-party service provider, the server(s) 1010 can be accessible via one or more APIs or other integrations.

As described above, the service provider can facilitate peer-to-peer transactions, which can enable users 1006 to transfer fiat currency, non-fiat currency, cryptocurrency, securities, or other assets, or portions thereof, to other users 1006. In at least one example, individual users can be associated with user accounts. Additional details associated with user accounts and the transfer of assets between users 1006 are described below with reference to FIG. 11.

Furthermore, the service provider can enable users 1006 to perform banking transactions via instances of the payment application 1018. For example, users can configure direct deposits or other deposits for adding assets to their various ledgers/balances. Further, users 1006 can configure bill pay, recurring payments, and/or the like using assets associated with their accounts. In addition to sending and/or receiving assets via peer-to-peer transactions, users 1006 buy and/or sell assets via asset networks such as cryptocurrency networks, securities networks, and/or the like.

FIG. 11 is an example of data store(s) that can be associated with servers of the payment service, according to an embodiment described herein. In at least one example, the data store(s) 1100 can store assets in an asset storage 1102, as well as data in user account(s) 1104, merchant account(s) 1106, and/or customer account(s) 1108. In at least one example, the asset storage 1102 can be used to store assets managed by the service provider. In at least one example, the asset storage 1102 can be used to record whether individual of the assets are registered to users. For example, the asset storage 1102 can include an asset wallet 1110 for storing records of assets owned by the service provider, such as cryptocurrency, securities, or the like, and communicating with one or more asset networks, such as cryptocurrency networks, securities networks, or the like. In some examples, the asset network can be a first-party network or a third-party network, such as a cryptocurrency exchange or the stock market. In examples where the asset network is a third-party network, the server(s) 1010 can be associated therewith. In some examples, the asset wallet 1110 can communication with the asset network via one or more components associated with the server(s) 1002.

The asset wallet 1110 can be associated with one or more addresses and can vary addresses used to acquire assets (e.g., from the asset network(s)) so that its holdings are represented under a variety of addresses on the asset network. In examples where the service provider has its own holdings of cryptocurrency (e.g., in the asset wallet 1110), a user can acquire cryptocurrency directly from the service provider. In some examples, the service provider can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of asset network can be separate from any customer-merchant transaction or peer-to-peer transaction, and therefore not necessarily time-sensitive. This can enable batching transactions to reduce computational resources and/or costs. The service provider can provide the same or similar functionality for securities or other assets.

The asset storage 1102 may contain ledgers that store records of assignments of assets to users 1006. Specifically, the asset storage 1102 may include asset ledger 1110, fiat currency ledger 1114, and other ledger(s) 1116, which can be used to record transfers of assets between users 1006 of the service provider and/or one or more third-parties (e.g., merchant network(s), payment card network(s), ACH network(s), equities network(s), the asset network, securities networks, etc.). In doing so, the asset storage 1102 can maintain a running balance of assets managed by the service provider. The ledger(s) of the asset storage 1102 can further indicate some of the running balance for each of the ledger(s) stored in the asset storage 1102 is assigned or registered to one or more user account(s) 1104.

In at least one example, the asset storage 1102 can include transaction logs 1118, which can include records of past transactions involving the service provider. In at least one example, transaction data, as described herein, can be stored in association with the transaction logs 1118.

In some examples, the data store(s) 1100 can store a private blockchain 1119. A private blockchain 1119 can function to record sender addresses, recipient addresses, public keys, values of cryptocurrency transferred, and/or can be used to verify ownership of cryptocurrency tokens to be transferred. In some examples, the service provider can record transactions taking place within the service provider involving cryptocurrency until the number of transactions has exceeded a determined limit (e.g., number of transactions, storage space allocation, etc.). Based at least in part on determining that the limit has been reached, the service provider can publish the transactions in the private blockchain 1119 to a public blockchain (e.g., associated with the asset network), where miners can verify the transactions and record the transactions to blocks on the public blockchain. In at least one example, the service provider can participate as miner(s) at least for its transactions to be posted to the public blockchain.

In at least one example, the data store(s) 1100 can store and/or manage accounts, such as user account(s) 1104, merchant account(s) 1106, and/or customer account(s) 1108. In at least one example, the user account(s) 1104 may store records of user accounts associated with the users 1006. In at least one example, the user account(s) 1104 can include a user account 1120, which can be associated with a user (of the users 1006). Other user accounts of the user account(s) 1104 can be similarly structured to the user account 1120, according to some examples. In other examples, other user accounts may include more or less data and/or account information than that provided by the user account 1120. In at least one example, the user account 1120 can include user account data 1128, which can include, but is not limited to, data associated with user identifying information (e.g., name, phone number, address, etc.), user identifier(s) (e.g., alphanumeric identifiers, etc.), user preferences (e.g., learned or user-specified), purchase history data (e.g., identifying one or more items purchased (and respective item information), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1128 can include account activity 1130 and user wallet key(s) 1132. The account activity 1130 may include a transaction log for recording transactions associated with the user account 1120. In some examples, the user wallet key(s) 1132 can include a public-private key-pair and a respective address associated with the asset network or other asset networks. In some examples, the user wallet key(s) 1132 may include one or more key pairs, which can be unique to the asset network or other asset networks.

In addition to the user account data 1128, the user account 1120 can include ledger(s) for account(s) managed by the service provider, for the user. For example, the user account 1120 may include an asset ledger 1134, a fiat currency ledger 1136, and/or one or more other ledgers 1138. The ledger(s) can indicate that a corresponding user utilizes the service provider to manage corresponding accounts (e.g., a cryptocurrency account, a securities account, a fiat currency account, etc.). It should be noted that in some examples, the ledger(s) can be logical ledger(s) and the data can be represented in a single database. In some examples, individual of the ledger(s), or portions thereof, can be maintained by the service provider.

In some examples, the asset ledger 1134 can store a balance for each of one or more cryptocurrencies (e.g., Bitcoin, Ethereum, Litecoin, etc.) registered to the user account 1120. In at least one example, the asset ledger 1134 can further record transactions of cryptocurrency assets associated with the user account 1120. For example, the user account 1120 can receive cryptocurrency from the asset network using the user wallet key(s) 1132. In some examples, the user wallet key(s) 1132 may be generated for the user upon request. User wallet key(s) 1132 can be requested by the user in order to send, exchange, or otherwise control the balance of cryptocurrency held by the service provider (e.g., in the asset wallet 1110) and registered to the user. In some examples, the user wallet key(s) 1132 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider and the value is credited as a balance in asset ledger 1134), by purchasing currency in the form associated with the account using currency in a different form (e.g., buying a value of cryptocurrency from the service provider using a value of fiat currency reflected in fiat currency ledger 1114, and crediting the value of cryptocurrency in asset ledger 1134), or by conducting a transaction with another user (customer or merchant) of the service provider wherein the account receives incoming currency (which can be in the form associated with the account or a different form, in which the incoming currency may be converted to the form associated with the account). In some examples, the user account data 1128 can include preferences for maintaining balances of individual of the ledgers. For example, the service provider can automatically debit the fiat currency ledger 1136 to increase the asset ledger 1134, or another account associated with the user whenever the cryptocurrency balance (e.g., of the asset ledger 1134) falls below a stated level (e.g., a threshold). Conversely, in some embodiments, the service provider can automatically credit the fiat currency ledger 1136 to decrease the asset ledger 1134 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party (e.g., associated with the third-party server(s)) unrelated to the service provider (i.e., an external account). In at least one example, the user can transfer all or a portion of a balance of the cryptocurrency stored in the third-party cryptocurrency wallet to the service provider. Such a transaction can require the user to transfer an amount of the cryptocurrency in a message signed by user's private key to an address provided by the service provider. In at least one example, the transaction can be sent to miners to bundle the transaction into a block of transactions and to verify the authenticity of the transactions in the block. Once a miner has verified the block, the block is written to a public, distributed blockchain where the service provider can then verify that the transaction has been confirmed and can credit the user's asset ledger 1134 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the service provider. As described above, in some examples, the service provider can acquire cryptocurrency from a third-party source (e.g., associated with the third-party server(s)). In such examples, the asset wallet 1110 can be associated with different addresses and can vary addresses used to acquire cryptocurrency so that its holdings are represented under a variety of addresses on a blockchain. When the service provider has their own holdings of cryptocurrency, users can acquire cryptocurrency directly from the service provider. In some examples, the service provider can include logic for buying and selling cryptocurrency in order to maintain a desired level of cryptocurrency. The desired level can be based on a volume of transactions over a period, balances of collective user profiles cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from any customer-merchant transaction, and therefore not necessarily time-sensitive.

In examples where the service provider has its own cryptocurrency assets, cryptocurrency transferred in a transaction (e.g., data with address provided for receipt of transaction and a balance of cryptocurrency transferred in the transaction) can be stored in the asset wallet 1110. In at least one example, the service provider can credit the asset ledger 1134 of the user. Additionally, while the service provider recognizes that the user retains the value of the transferred cryptocurrency through crediting the asset ledger 1134, any person that inspects the blockchain will see the cryptocurrency as having been transferred to the service provider. In some examples, the asset wallet can be associated with many different addresses. In such examples, any person that inspects the blockchain may not easily associate all cryptocurrency stored in asset wallet as belonging to the same entity. It is this presence of a private ledger that is used for real-time transactions and maintained by the service provider, combined with updates to the public ledger at other times, that allows for extremely fast transactions using cryptocurrency to be achieved. In some examples, the "private ledger" can refer to the asset ledger 1110, which in some examples, can utilize the private blockchain 1119, as described herein. The "public ledger" can correspond to a public blockchain associated with the asset network.

In at least one example, a user's asset ledger 1134, fiat currency ledger 1836, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1134. In some examples, a user can receive fiat currency or another currency in the form of payment for a transaction with another user. In at least one example, at least a portion of such funds can be converted into cryptocurrency by the service provider and used to fund the asset ledger 1134 of the user.

As addressed above, in some examples, users can also have other accounts maintained by the service provider. For example, a user can also have an account in U.S. dollars, which can be tracked, for example, via the fiat currency ledger 1136. Such an account can be funded by transferring money from a bank account at a third-party bank to an account maintained by the service provider as is conventionally known. In some examples, a user can receive fiat currency in the form of payment for a transaction with another user. In such examples, at least a portion of such funds can be used to fund the fiat currency ledger 1136.

In some examples, a user can have one or more internal payment cards registered with the service provider. Internal payment cards can be linked to one or more of the accounts associated with the user account 1120. In some embodiments, options with respect to internal payment cards can be adjusted and managed using an application (e.g., the payment application 1018).

In at least one example, as described above, each ledger can correspond to an account of the user that is managed by the service provider. In at least one example, individual of the accounts can be associated with a wallet or a stored balance for use in payment transactions, peer-to-peer transactions, payroll payments, etc.

In at least one example, the user account 1120 can be associated with an asset wallet 1140. The asset wallet 1140 of the user can be associated with account information that can be stored in the user account data 1128 and, in some examples, can be associated with the user wallet key(s) 1132. In at least one example, the asset wallet 1140 can store data indicating an address provided for receipt of a cryptocurrency transaction. In at least one example, the balance of the asset wallet 1140 can be based at least in part on a balance of the asset ledger 1134. In at least one example, funds availed via the asset wallet 1840 can be stored in the asset wallet 1140 or the asset wallet 1110. Funds availed via the asset wallet 1110 can be tracked via the asset ledger 1134. The asset wallet 1140, however, can be associated with additional cryptocurrency funds.

In at least one example, when the service provider includes a private blockchain 1119 for recording and validating cryptocurrency transactions, the asset wallet 1140 can be used instead of, or in addition to, the asset ledger 1134. For example, at least one example, a merchant can provide the address of the asset wallet 1140 for receiving payments. In an example where a customer is paying in cryptocurrency and the customer has their own cryptocurrency wallet account associated with the service provider, the customer can send a message signed by its private key including its wallet address (i.e., of the customer) and identifying the cryptocurrency and value to be transferred to the merchant's asset wallet 1140. The service provider can complete the transaction by reducing the cryptocurrency balance in the customer's cryptocurrency wallet and increasing the cryptocurrency balance in the merchant's asset wallet 1140. In addition to recording the transaction in the respective cryptocurrency wallets, the transaction can be recorded in the private blockchain 1119 and the transaction can be confirmed. A user can perform a similar transaction with cryptocurrency in a peer-to-peer transaction as described above. In at least one example, the cryptocurrency wallet account 1130 can be funded by a balance transfer from a third-party cryptocurrency wallet, as described above. Such a transaction can require a user to transfer an amount of cryptocurrency in a message signed by the user's private key to an address of the cryptocurrency wallet account 1130. The transferred amount of cryptocurrency can then be within the cryptocurrency wallet account 1130 for use in later transactions.

While the asset ledger 1134 and/or asset wallet 1140 are each described above with reference to cryptocurrency, the asset ledger 1134 and/or asset wallet 1140 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider is an aspect of the technology disclosed that enables technical advantages of increased processing speed and improved security.

Figure 12:
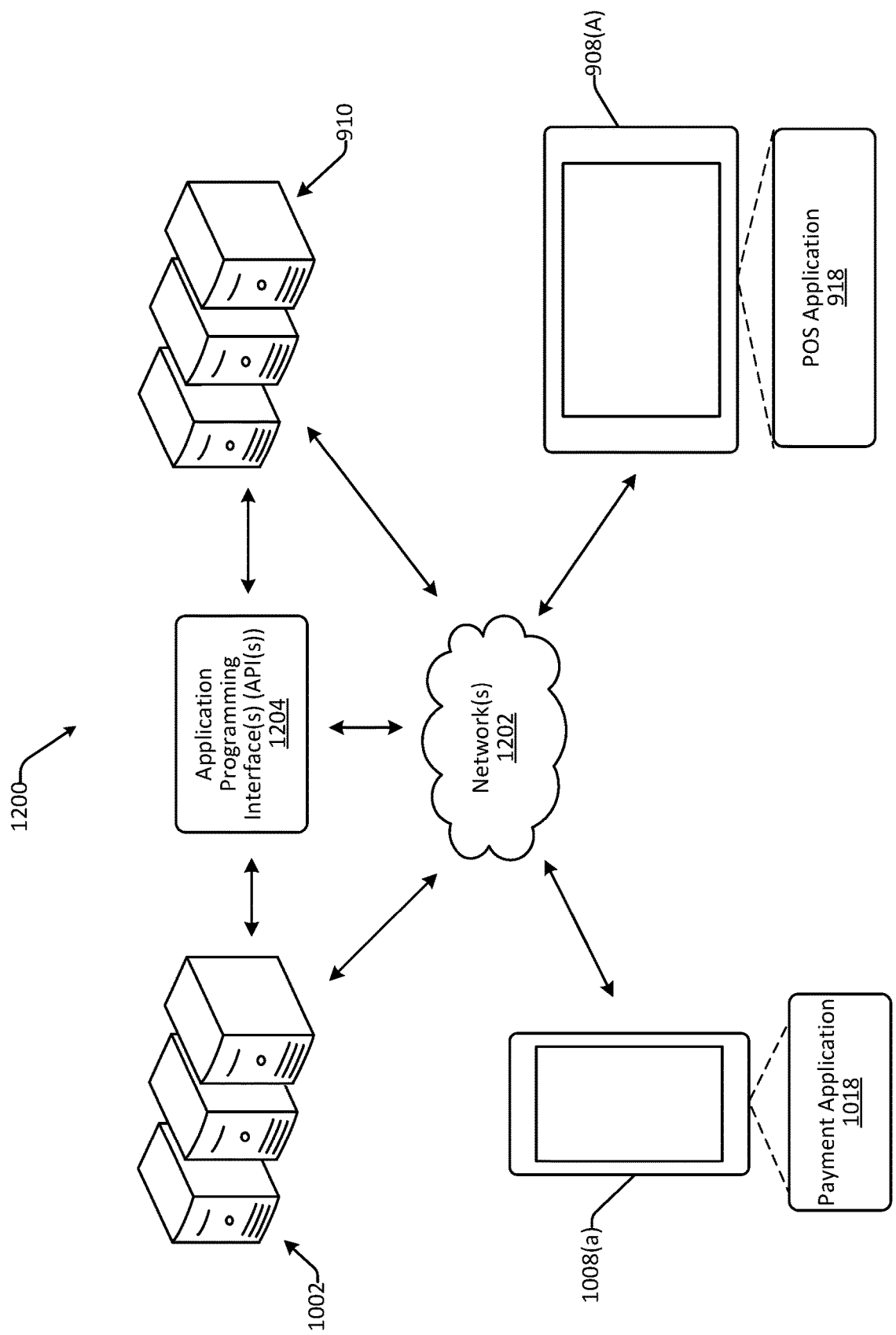
FIG. 12 is an example environment wherein the payment service environment of FIG. 9 can be integrated to enable payments at the point-of-sale using assets associated with user accounts in the peer-to-peer environment of FIG. 10, according to an embodiment described herein.

FIG. 12 is an example environment 1200 wherein the environment 1200 and the environment 1000 can be integrated to enable payments at the point-of-sale using assets associated with user accounts in the peer-to-peer environment of FIG. 10, according to an embodiment described herein. As illustrated, each of the components can communicate with one another via one or more networks. In some examples, one or more APIs 1204 or other functional components can be used to facilitate such communication. For example, the APIs 1204 can be used to facilitate communication with payment service server(s) 1002 and server(s) 1010 associated with third-party service provider(s).

In at least one example, the example environment 1200 can enable contactless payments, via integration of peer-to-peer payment, or other payment making, platform(s) and payment processing platform(s), are described herein. For the purpose of FIG. 12, the environment 1200 can refer to a payment processing platform and the environment 1000 can refer to a peer-to-peer payment, or payment making, platform. In an example, such an integration can enable a customer to participate in a transaction via their own computing device instead of interacting with a merchant device of a merchant, such as the merchant device 1208(A). In such an example, the POS application 1218, associated with a payment processing platform and executable by the merchant device 1208(A) of the merchant, can present a Quick Response (QR) code, or other code that can be used to identify a transaction (e.g., a transaction code), in association with a transaction between the customer and the merchant. The QR code, or other transaction code, can be provided to the POS application 1218 via an API associated with the peer-to-peer payment platform. In an example, the customer can utilize their own computing device, such as the user device 1008(A), to capture the QR code, or the other transaction code, and to provide an indication of the captured QR code, or other transaction code, to server(s) 1202 and/or server(s) 1002.

Based at least in part on the integration of the peer-to-peer payment platform and the payment processing platform (e.g., via the API), the server(s) 1202 and/or 1002 associated with each can exchange communications with each other—and with a payment application 1018 associated with the peer-to-peer payment platform and/or the POS application 1218—to process payment for the transaction using a peer-to-peer payment where the customer is a first "peer" and the merchant is a second "peer." In at least one example, the peer-to-peer payment platform can transfer funds from an account of the customer, maintained by the peer-to-peer payment platform, to an account of the merchant, maintained by the payment processing platform, thereby facilitating a contactless (peer-to-peer) payment for the transaction. That is, based at least in part on receiving an indication of which payment method a user (e.g., customer or merchant) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, customer details, or the like to a computing device of the customer, such as the user device 1008(A), to enable a contactless (peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 1008(A), can be specially configured as a buyer-facing device that can enable the customer to view cart building in near real-time, interact wvith a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 1218 and the payment application 1018, as described herein, can process a payment transaction by routing information input via the merchant application to the payment application for completing a "frictionless" payment. This can be referred to as "in-application payment." In another example of "in-application payment," the payment application described herein can be created or modified via a software developer kit (SDK) to enable in-application payment.

Returning to the "scan to pay" examples described herein. QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. In such a "scan to pay" example, a customer computing device, such as the user device 1008(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc.

In an example, a customer can desire to purchase items from a merchant. When the customer approaches the merchant to check out., the merchant (e.g., a worker associated therewith) can add indications of the items to a virtual cart via the POS application 1218, associated with a payment processing platform, on the merchant device 1208(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant device 1208(A) can present a QR code, or other transaction code, that can be associated with a peer-to-peer payment platform. The customer can use a camera associated with the user device 1008(A) to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction-between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a customer can desire to purchase items from a merchant. When the customer approaches the merchant to check out, the merchant (e.g., a worker associated therewith) can add indications of the items to a virtual cart via the POS application 1218, associated with a payment processing platform, on the merchant device 1208(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application 1218 can cause a message with a resource locator (e.g., uniform resource locator (URL)) that can be associated with a peer-to-peer payment platform to be sent to the user device 1008(A). The customer can interact with the resource locator and, if the customer is already associated With the peer-to-peer payment platform (e.g., has an existing account, previously onboarded, etc.), the peer-to-peer payment platform can provide an indication of the interaction with the resource locator to the payment processing platform. This interaction-between the customer and the resource locator presented via the customer computing device—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. As described above, such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

The same or similar techniques can be applicable in online and/or ecommerce selling channels as well. In such an example, a QR code, or other transaction code, can be presented via an online store/ecommerce web page of a merchant. The customer can use a camera associated with a customer computing device, such as the user device 1008 (A), to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As described above, techniques described herein offer improvements to conventional payment technologies. In an example, techniques described herein can enable transaction data to be sent from a POS application 1218 of a merchant device 1208(A) at a brick-and-mortar store of a merchant to a payment application 1018 of a user device 1008(A) of a customer to enable the customer to participate in a transaction via their own computing device. For instance, in a "scan to pay" example as described above, based at least in part on capturing the QR code, or other transaction code, via the user device 1008(A), the payment processing platform can provide transaction data to the peer-to-peer payment platform for presentation via the payment application 1018 on the user device 1008(A). In some examples, the customer can watch items being added to their cart (e.g., via a user interface presented via the payment application). As an item is added to a virtual cart by the merchant—via the POS application 1218 on the merchant device 1208(A) of the merchant—the customer can see the item in their virtual cart on their own computing device in near-real time. In another example, the peer-to-peer payment platform can analyze transaction data as it is received to determine whether an incentive (e.g., a discount, a loyalty reward, prioritized access or booking, etc.) is applicable to the transaction and can automatically apply the incentive or send a recommendation to the payment application 1018 for presentation via a user interface associated therewith. In addition to enabling a customer to participate in a transaction during cart building, techniques described herein can enable a customer to complete a transaction, and in some examples, provide gratuity (i.e., a tip), feedback, loyalty information, or the like, via the user device 1008(A) during or after payment of the transaction.

In some examples, based at least in part on capturing the QR code, or other transaction code, the payment processing platform can provide transaction data to the peer-to-peer payment platform for presentation via the payment application 1018 on the computing device of the customer, such as the user device 1008(A), to enable the customer to complete the transaction via their own computing device. In some examples, in response to receiving an indication that the QR code, or other transaction code, has been captured or otherwise interacted with via the customer computing device, the peer-to-peer payment platform can determine that the customer authorizes payment of the transaction using funds associated with a stored balance of the customer that is managed and/or maintained by the peer-to-peer payment platform. Such authorization can be implicit such that the interaction with the transaction code can imply authorization of the customer. In some examples, in response to receiving an indication that the QR code, or other transaction code, has been captured or otherwise interacted with via the customer computing device, the peer-to-peer payment platform can request authorization to process payment for the transaction using the funds associated with the stored balance and the customer can interact with the payment application to authorize the settlement of the transaction. A response to such a request can provide an express authorization of the customer. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the peer-to-peer payment platform can transfer funds from the stored balance of the customer to the payment processing platform. In at least one example, the payment processing platform can deposit the funds, or a portion thereof, into a stored balance of the merchant that is managed and/or maintained by the payment processing platform. That is, techniques described herein enable the peer-to-peer payment platform to transfer funds to the payment processing platform to settle payment of the transaction. In such an example, the payment processing platform can be a "peer" to the customer in a peer-to-peer transaction.

In some examples, techniques described herein can enable the customer to interact with the transaction after payment for the transaction has been settled. For example, in at least one example, the payment processing platform can cause a total amount of a transaction to be presented via a user interface associated with the payment application 1018 such that the customer can provide gratuity, feedback, loyalty information, or the like, via an interaction with the user interface. In some examples, because the customer has already authorized payment via the peer-to-peer payment platform, if the customer inputs a tip, the peer-to-peer payment platform can transfer additional funds, associated with the tip, to the payment processing platform. This pre-authorization (or maintained authorization) of sorts can enable faster, more efficient payment processing when the tip is received. Further, the customer can provide feedback and/or loyalty information via the user interface presented by the payment application, which can be associated with the transaction.

As described above—and also below—techniques described herein enable contactless payments. That is, by integrating the payment processing platform with the peer-to-peer payment platform, merchants and customers can participate in transactions via their own computing devices without needing to touch, or otherwise be in contact, with one another. By moving aspects of a transaction that are traditionally performed on a computing device of a merchant to a computing device of a customer, customers can have more control over the transaction and can have more privacy. That is, customers can monitor items that are added to their cart to ensure accuracy. Further, customers can authorize payments, use rewards, claim incentives, add gratuity, or the like without being watched by the merchant or other customers.

In some examples, such as when the QR code, or other transaction code, is captured by the computing device of the customer prior to a payment selection user interface being presented via the POS application 1218, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in some examples, when a customer adds a tip after payment for a transaction has been settled, in some examples, because the peer-to-peer payment platform has already been authorized, the peer-to-peer payment platform and the payment processing platform may not need to obtain another authorization to settle funds associated with the tip. That is, in such examples, fewer data transmissions are required and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 1018 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. For example, based at least in part on detecting a dip, tap, swipe, or the like, the payment processing platform can associate a customer with a transaction and provide at least a portion of transaction data associated with the transaction to a customer computing device associated therewith. In some examples, the payment instrument can be associated with the peer-to-peer payment platform as described herein (e.g., a debit card linked to a stored balance of a customer) such that when the payment instrument is caused to interact with a payment reader, the payment processing platform can exchange communications with the peer-to-peer payment platform to authorize payment for a transaction and/or provision associated transaction data to a computing device of the customer associated with the transaction.

Figure 13:
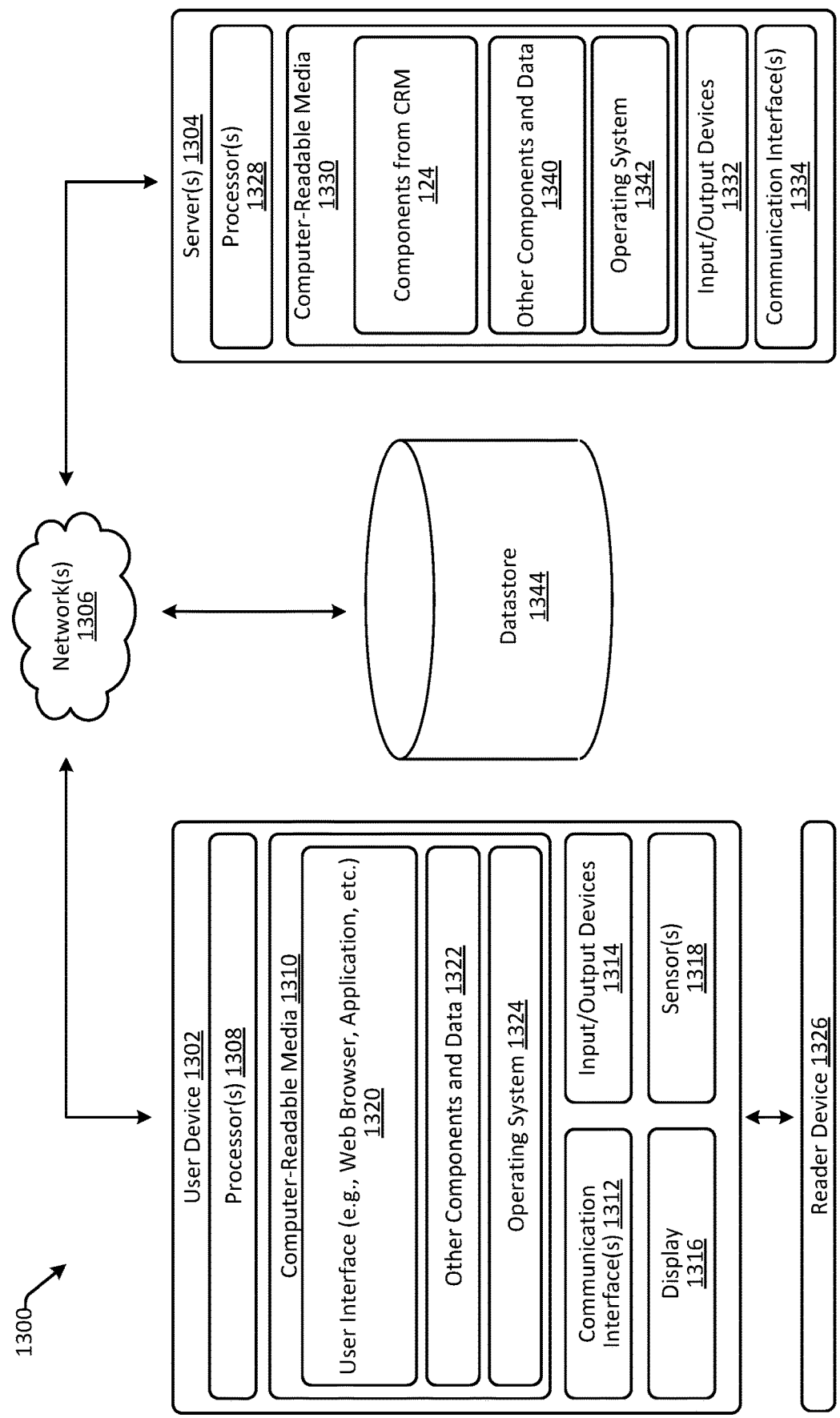
FIG. 13 is an illustrative block diagram illustrating a system for performing techniques described herein, according to an embodiment described herein.

FIG. 13 is an illustrative block diagram illustrating a system for performing techniques described herein, according to an embodiment described herein. The system 1300 includes a user device 1302, that communicates with server computing device(s) (e.g., server(s) 1304) via network(s) 1306 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1302 is illustrated, in additional or alternate examples, the system 1300 can have multiple user devices, as described above with reference to FIG. 13. The user device 1302 may be the same or similar to the customer device 103 and/or the user device 102 as described with respect to FIG. 1. Additionally, the server(s) may be the same or similar to the payment processing service 104 described with respect to FIG. 1.

In at least one example, the user device 1302 can be any suitable type of computing device, e.g., portable, semi-portable, semi-stationary, or stationary. Some examples of the user device 1302 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1302 can be any computing device capable of sending communications and performing the functions according to the techniques described herein. The user device 1302 can include devices, e.g., payment card readers, or components capable of accepting payments, as described below.

In the illustrated example, the user device 1302 includes one or more processors 1308, one or more computer-readable media 1310, one or more communication interface(s) 1312, one or more input/output (I/O) devices 1314, a display 1316, and sensor(s) 1318.

In at least one example, each processor 1308 can itself comprise one or more processors or processing cores. For example, the processor(s) 1308 can be implemented as one or more microprocessors, microcomputers, microcontrollers, digital signal processors, central processing units, state machines, logic circuitries, and/or any devices that manipulate signals based on operational instructions. In some examples, the processor(s) 1308 can be one or more hardware processors and/or logic circuits of any suitable type specifically programmed or configured to execute the algorithms and processes described herein. The processor(s) 1308 can be configured to fetch and execute computer-readable processor-executable instructions stored in the computer-readable media 1310.

Depending on the configuration of the user device 1302, the computer-readable media 1310 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1310 can include, but is not limited to, RAM, ROM, EEPROM, flash memory, solid-state storage, magnetic disk storage, optical storage, and/or other computer-readable media technology. Further, in some examples, the user device 1302 can access external storage, such as RAID storage systems, storage arrays, network attached storage, storage area networks, cloud storage, or any other medium that can be used to store information and that can be accessed by the processor(s) 1308 directly or through another computing device or network. Accordingly, the computer-readable media 1310 can be computer storage media able to store instructions, components or components that can be executed by the processor(s) 1308. Further, when mentioned, non-transitory computer-readable media exclude media such as energy, carrier signals, electromagnetic waves, and signals per se.

The computer-readable media 1310 can be used to store and maintain any number of functional components that are executable by the processor(s) 1308. In some implementations, these functional components comprise instructions or programs that are executable by the processor(s) 1308 and that, when executed, implement operational logic for performing the actions and services attributed above to the user device 1302. Functional components stored in the computer-readable media 1310 can include a user interface 1320 to enable users to interact with the user device 1302, and thus the server(s) 1304 and/or other networked devices. In at least one example, the user interface 1320 can be presented via a web browser, or the like. In other examples, the user interface 1320 can be presented via an application, such as a mobile application or application, which can be provided by a service provider associated with the server(s) 1304, or which can be an otherwise dedicated application. In some examples, the user interface 1320 can be configured to display options for withdrawing funds to make donations. The user interface 1320 may also be configured to surface information about donations. In at least one example, a user can interact with the user interface via touch input, spoken input, gesture, or any other type of input. The word "input" is also used to describe "contextual" input that may not be directly provided by the user via the user interface 1320. For example, user's interactions with the user interface 1320 are analyzed using, e.g., natural language processing techniques, to determine context or intent of the user, which may be treated in a manner similar to "direct" user input.

Depending on the type of the user device 1302, the computer-readable media 1310 can also optionally include other functional components and data, such as other components and data 1322, which can include programs, drivers, etc., and the data used or generated by the functional components. In addition, the computer-readable media 1310 can also store data, data structures and the like, that are used by the functional components. Further, the user device 1302 can include many other logical, programmatic and physical components, of which those described are merely examples that are related to the discussion herein.

In at least one example, the computer-readable media 1310 can include additional functional components, such as an operating system 1324 for controlling and managing various functions of the user device 1302 and for enabling basic user interactions.

The communication interface(s) 1312 can include one or more interfaces and hardware components for enabling communication with various other devices, such as over the network(s) 1306 or directly. For example, communication interface(s) 1312 can enable communication through one or more network(s) 1306, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1306 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1302 can further include one or more input/output (I/O) devices 1314. The I/O devices 1314 can include speakers, a microphone, a camera, and various user controls (e.g., buttons, a joystick, a keyboard, a keypad, etc.), a haptic output device, and so forth. The I/O devices 1314 can also include attachments that leverage the accessories (audio-jack, USB-C, Bluetooth, etc.) to connect with the user device 1302.

In at least one example, user device 1302 can include a display 1316. Depending on the type of computing device(s) used as the user device 1302, the display 1316 can employ any suitable display technology. For example, the display 1316 can be a liquid crystal display, a plasma display, a light emitting diode display, an OLED (organic light-emitting diode) display, an electronic paper display, or any other suitable type of display able to present digital content thereon. In at least one example, the display 1316 can be an augmented reality display, a virtually reality display, or any other display able to present and/or project digital content. In some examples, the display 1316 can have a touch sensor associated with the display 1316 to provide a touchscreen display configured to receive touch inputs for enabling interaction with a graphic interface presented on the display 1316. Accordingly, implementations herein are not limited to any particular display technology. Alternatively, in some examples, the user device 1302 may not include the display 1316, and information can be presented by other means, such as aurally, haptically, etc.

In addition, the user device 1302 can include sensor(s) 1318. The sensor(s) 1318 can include a GPS device able to indicate location information. Further, the sensor(s) 1318 can include, but are not limited to, an accelerometer, gyroscope, compass, proximity sensor, camera, microphone, and/or a switch.

In some example, the GPS device can be used to identify a location of a user. In at least one example, the location of the user can be used by the service provider 1324, described above, to provide one or more services. That is, in some examples, the service provider 1324 can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users 1314 and/or for sending users 1314 notifications regarding available appointments with merchant(s) located proximate to the users 1314. In at least one example, location can be used for taking payments from nearby customers when they leave a geofence, or location can be used to initiate an action responsive to users 1314 enter a brick-and-mortar store of a merchant. Location can be used in additional or alternative ways as well.

Additionally, the user device 1302 can include various other components that are not shown, examples of which include removable storage, a power source, such as a battery and power control unit, a barcode scanner, a printer, a cash drawer, and so forth.

In addition, in some examples, the user device 1302 can include, be connectable to, or otherwise be coupled to a reader device 1326, for reading payment instruments and/or identifiers associated with payment objects. In some examples, as described above, the reader device 1326 can plug in to a port in the user device 1302, such as a microphone port, a headphone port, an audio-jack, a data port, or other suitable port. In additional or alternative examples, the reader device 1326 can be coupled to the user device 1302 via another wired or wireless connection, such as via a Bluetooth®, BLE, and so on. The reader device 1326 can include a read head for reading a magnetic strip of a payment card, and further can include encryption technology for encrypting the information read from the magnetic strip. Additionally or alternatively, the reader device 1326 can be an EMV payment reader, which in some examples, can be embedded in the user device 1302. Moreover, numerous other types of readers can be employed with the user device 1302 herein, depending on the type and configuration of the user device 1302.

The reader device 1326 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1326 may include hardware implementation, such as slots, magnetic tracks, and rails with one or more sensors or electrical contacts to facilitate detection and acceptance of a payment instrument. That is, the reader device 1326 may include hardware implementations to enable the reader device 1326 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1326 may also include a biometric sensor to receive and process biometric characteristics and process them as payment instruments, given that such biometric characteristics are registered with the payment processing service 104 and connected to a financial account with a bank server.

The reader device 1326 may include processing unit(s), computer-readable media, a reader chip, a transaction chip, a timer, a clock, a network interface, a power supply, and so on. The processing unit(s) of the reader device 1326 may execute one or more components and/or processes to cause the reader device 1326 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 1326, the computer-readable media may include volatile memory (such as RAM), non-volatile memory (such as ROM, flash memory, miniature hard drive, memory card, or the like), or some combination thereof. In at least one example, the computer-readable media of the reader device 1326 may include at least one component for performing various functions as described herein.

The reader chip may perform functionalities to control the operations and processing of the reader device 1326. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock, which may provide a clock signal indicating a time. Furthermore, the reader chip may perform functionality to control the network interface, which may interface with the network(s) 1306, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1326. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While the user device 1302, which can be a POS terminal, and the reader device 1326 are shown as separate devices, in additional or alternative examples, the user device 1302 and the reader device 1326 can be part of a single device, which may be a battery-operated device. In such an example, components of both the user device 1302 and the reader device 1326 may be associated with the single device. In some examples, the reader device 1326 can have a display integrated therewith, which can be in addition to (or as an alternative of) the display 1316 associated with the user device 1302.

The server(s) 1304 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1304 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1304 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1304 can include one or more processors 1328, one or more computer-readable media 1330, one or more I/O devices 1332, and one or more communication interfaces 1334. Each processor 1328 can be a single processing unit or a number of processing units, and can include single or multiple computing units or multiple processing cores. The processor(s) 1328 can be implemented as one or more microprocessors, microcomputers, microcontrollers, digital signal processors, central processing units, state machines, logic circuitries, and/or any devices that manipulate signals based on operational instructions. For example, the processor(s) 1328 can be one or more hardware processors and/or logic circuits of any suitable type specifically programmed or configured to execute the algorithms and processes described herein. The processor(s) 1328 can be configured to fetch and execute computer-readable instructions stored in the computer-readable media 1330, which can program the processor(s) 1328 to perform the functions described herein.

The computer-readable media 1330 can include volatile and nonvolatile memory and/or removable and non-removable media implemented in any type of technology for storage of information, such as computer-readable instructions, data structures, program components, or other data. Such computer-readable media 1330 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1304, the computer-readable media 1330 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1330 can be used to store any number of functional components that are executable by the processor(s) 1328. In many implementations, these functional components comprise instructions or programs that are executable by the processors 1328 and that, when executed, specifically configure the one or more processors 1328 to perform the actions attributed above to the service provider and/or payment processing service.

The other components may include a training component that can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1302 and/or the server(s) 1304 for use at a time after the data models have been trained (e.g., at runtime).

The one or more other components and data can include programs, drivers, etc., and the data used or generated by the functional components. Further, the server(s) 1304 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1330 can additionally include an operating system 1342 for controlling and managing various functions of the server(s) 1304. The computer-readable media 1330 may include one or more other components and data 1340 such as those described with respect to FIG. 1. Additionally, the CRM 1330 may include any or all of the components from the CRM 124 described with respect to FIG. 1.

The communication interface(s) 1334 can include one or more interfaces and hardware components for enabling communication with various other devices, such as over the network(s) 1306 or directly. For example, communication interface(s) 1334 can enable communication through one or more network(s) 1306, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1304 can further be equipped with various I/O devices 1332. Such I/O devices 1332 can include a display, various user interface controls (e.g., buttons, joystick, keyboard, mouse, touch screen, biometric or sensory input devices, etc.), audio speakers, connection ports and so forth.

In at least one example, the system 1300 can include a datastore 1344 that can be configured to store data that is accessible, manageable, and updatable. In some examples, the datastore 1344 can be integrated with the user device 1302 and/or the server(s) 1304. In other examples, as shown in FIG. 13, the datastore 1344 can be located remotely from the server(s) 1304 and can be accessible to the server(s) 1304. The datastore 1344 can comprise multiple databases and/or servers connected locally and/or remotely via the network(s) 1306.

In at least one example, the datastore 1344 can store user profiles, which can include merchant profiles, customer profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

Furthermore, in at least one example, the datastore 1344 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1344 can store additional or alternative types of data as described herein.

Example Clauses

1. A system, comprising: one or more processors; and non-transitory computer-readable media storing instructions that, when executed by the one or more processors, cause the one or more processors to perform operations comprising: determining that a status of a first data object representing a first order has changed; determining that a status of a second data object representing a second order has changed; determining whether to provide an audible alert about the first order instead of the second order based at least in part on attributes of the first order and attributes of the second order; identifying predefined audio data associated with a status change associated with the first order; and causing output, utilizing the predefined audio data and by a speaker of a device associated with the first data object and the second data object, of the audible alert about the first order.

2. The system of clause 1, the operations further comprising: determining a first status type associated with the status of the first data object; and determining a second status type associated with the status of the second data object, wherein: the first status type differs from the second status type; and determining whether to provide the audible alert about the first order instead of the second order is based at least in part on the first status type and the second status type.

3. The system of clauses 1 and/or 2, the operations further comprising: determining, following causing output of the audible alert, that the status of the first data object has remained unchanged for at least a threshold period of time; and causing output of an audible reminder associated with the audible alert based at least in part on determining that the status of the first data object has remained unchanged for at least the threshold period of time.

4. The system of any of clauses 1, 2, and/or 3, the operations further comprising: storing account data for an entity associated with the first data object and the second data object, the account data indicating audible alert settings configured to be adjustable by user input received from the entity; determining, based at least in part on the account data, whether the audible alert settings indicate selection of at least one of a text-to-speech option or a predefined sound option; and based at least in part on: determining that the audible alert settings indicate selection of the at least one of the text-to-speech option or the predefined sound option, selecting the predefined audio data to include at least one of text-to-speech or a predefined sound; and determining that selection of the at least one of the text-to-speech option or the predefined sound option is absent, selecting the predefined audio data to include a default sound.

5. A method, comprising: determining a status change of a data object representing an order; determining attributes of the order; determining to provide an audible alert about the order based at least in part on the status change and the attributes of the order; identifying first predefined audio data associated with the status change of the order; and causing output, utilizing the first predefined audio data and by a speaker of a device associated with the data object, of the audible alert about the order.

6. The method of clause 5, further comprising: detecting, from audio data representing audio in an environment where the device is disposed, ambient sound occurring in the environment; identifying an ambient sound type of the ambient sound based at least in part on characteristics of the audio data; and determining to utilize the first predefined audio data instead of second predefined audio data to output the audible alert based at least in part on the ambient sound type of the ambient sound.

7. The method of clauses 5 and/or 6, further comprising: detecting, from audio data representing audio in an environment where the device is disposed, ambient sound occurring in the environment; determining an amplitude value associated with the ambient sound; and determining a volume to output the audible alert at based at least in part on the amplitude value.

8. The method of any of clauses 5, 6, and/or 7, further comprising: receiving, from a camera associated with an environment where the device is disposed, image data representing one or more images of the environment; detecting, utilizing the image data, a person within a field of view of the camera; determining, utilizing the image data, a distance of the person from the camera; and determining a volume to output the audible alert at based at least in part on the distance.

9. The method of any of clauses 5, 6, 7, and/or 8, further comprising: detecting, from audio data representing audio in an environment where the device is disposed, a noise occurring in the environment; determining an amplitude value associated with the noise; determining that the amplitude value satisfies a threshold amplitude value; and causing, based at least in part on determining that the amplitude value satisfies the threshold amplitude value, a delay in outputting the audible alert.

10. The method of any of clauses 5, 6, 7, 8, and/or 9, further comprising: detecting, from audio data representing audio in an environment where the device is disposed, a noise occurring in the environment; determining an amplitude value associated with the noise; determining that the amplitude value satisfies a threshold amplitude value; and causing, based at least in part on determining that the amplitude value satisfies the threshold amplitude value, a display of the device to present a visual alert in synchronization with output of the audible alert.

11. The method of any of clauses 5, 6, 7, 8, 9, and/or 10, further comprising: storing account data for an entity associated with the first data object, the account data indicating a venue type associated with an environment in which the device is disposed; determining a set of audible alerts associated with the venue type; and enabling selection of the audible alert from the set of audible alerts associated with the venue type.

12. The method of any of clauses 5, 6, 7, 8, 9, 10, and/or 11, further comprising: generating a graphical user interface configured to: present an option to select from one or more audible alert types to associate with the audible alert; and receive user input data indicating selection of the one or more audible alert types; receiving, via the graphical user interface, the user input data indicating the selection of the one or more audible alert types; and associating the selection with account data of an entity associated with the device such that the audible alert corresponds to the selection of the one or more audible alert types.

13. A system, comprising: one or more processors; and non-transitory computer-readable media storing instructions that, when executed by the one or more processors, cause the one or more processors to perform operations comprising: determining a status change of an item order; determining attributes of the item order; determining to provide an audible alert about the item order based at least in part on the status change and the attributes of the item order; identifying predefined audio data associated with the status change; and causing output, utilizing the predefined audio data and by a speaker of a device associated with the item order, of the audible alert about the item order.

14. The system of clause 13, the operations further comprising: generating a graphical user interface configured to: present an option to generate synthesized speech from text as the audible alert; and receive user input data representing the text; receiving, via the graphical user interface, the user input data representing the text; and generating the predefined audio data from the user input data, the predefined audio data representing the synthesized speech.

15. The system of clauses 13 and/or 14, the operations further comprising: determining that a different audible alert is to be output while the audible alert is being output; selecting a first sound for the different audible alert predetermined to harmonize with a second sound of the audible alert; and causing output of the first sound and the second sound simultaneously.

16. The system of any of clauses 13, 14, and/or 15, the operations further comprising: generating a machine learning model configured to determine audio characteristics to apply to audible alerts in light of environmental characteristics of environments where audio-output devices are to be utilized for outputting the audible alerts; receiving feedback data indicate performance of the machine learning model to determine the audio characteristics; generating a training dataset from the feedback data; training the machine learning model utilizing the training dataset such that a trained machine learning model is generated; and determining specific audio characteristics to apply to the audible alert utilizing the trained machine learning model.

17. The system of any of clauses 13, 14, 15, and/or 16, the operations further comprising: determining that an environment where the device is disposed includes multiple speakers that include the speaker; associating individual ones of the multiple speakers with a portion of the environment, the portion of the environment associated with one or more functions associated with the item order; determining that the status change is associated with a specific portion of the environment; and selecting the speaker from the multiple speakers based at least in part on the speaker being associated with the specific portion of the environment.

18. The system of any of clauses 13, 14, 15, 16, and/or 17, the operations further comprising: determining that an environment where the device is disposed includes multiple speakers that include the speaker; determining that a person located in the environment is closest to the speaker of the multiple speakers based at least in part on analysis of audio data from microphones disposed in the environment; and selecting the speaker for output of the audible alert based at least in part on determining that the person is closest to the speaker of the multiple speakers.

19. The system of any of clauses 13, 14, 15, 16, 17, and/or 18, the operations further comprising: determining a user of multiple users that is situated in an environment where the device is disposed when the audible alert is to be output; determining a user profile associated with the user; and selecting the audible alert from multiple audible alerts based at least in part on characteristics of the user profile.

20. The system of any of clauses 13, 14, 15, 16, 17, 18, and/or 19, the operations further comprising: determining a user of multiple users that is situated in an environment where the device is disposed when the audible alert is to be output; determining a user profile associated with the user; and selecting the speaker from multiple speakers disposed in the environment to output the audible alert on based at least in part on characteristics of the user profile.

The phrases "in some examples," "according to various examples," "in the examples shown," "in one example," "in other examples," "various examples," "some examples,"

and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to FIGS. 7 and 8 for convenience and ease of understanding. However, the methods illustrated are not limited to being performed using components described in FIGS. 1-6, and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

The foregoing is merely illustrative of the principles of this disclosure and various modifications can be made by those skilled in the art without departing from the scope of this disclosure. The above described examples are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process limitations (e.g., dimensions, configurations, components, process step order, etc.) can be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A method, comprising:
    determining a status change of a data object representing an order;
    determining attributes of the order;
    determining to provide an audible alert about the order based at least in part on the status change and the attributes of the order;
    storing account data for an entity associated with the data object, the account data indicating a venue type associated with an environment in which a device associated with the data object is disposed;
    determining a set of audible alerts associated with the venue type;
    enabling selection of the audible alert from the set of audible alerts associated with the venue type;
    identifying first predefined audio data associated with the audible alert; and
    causing output, utilizing the first predefined audio data and by a speaker of the device, of the audible alert about the order.

2. The method of claim 1, further comprising:
    detecting, from audio data representing audio in the environment where the device is disposed, ambient sound occurring in the environment;
    identifying an ambient sound type of the ambient sound based at least in part on characteristics of the audio data; and
    determining to utilize the first predefined audio data instead of second predefined audio data to output the audible alert based at least in part on the ambient sound type of the ambient sound.

3. The method of claim 1, further comprising:
    detecting, from audio data representing audio in the environment where the device is disposed, ambient sound occurring in the environment;
    determining an amplitude value associated with the ambient sound; and
    determining a volume to output the audible alert at based at least in part on the amplitude value.

4. The method of claim 1, further comprising:
    receiving, from a camera associated with the environment where the device is disposed, image data representing one or more images of the environment;
    detecting, utilizing the image data, a person within a field of view of the camera;
    determining, utilizing the image data, a distance of the person from the camera; and
    determining a volume to output the audible alert at based at least in part on the distance.

5. The method of claim 1, further comprising:
    detecting, from audio data representing audio in the environment where the device is disposed, a noise occurring in the environment;
    determining an amplitude value associated with the noise;
    determining that the amplitude value satisfies a threshold amplitude value; and
    causing, based at least in part on determining that the amplitude value satisfies the threshold amplitude value, a delay in outputting the audible alert.

6. The method of claim 1, further comprising:
    detecting, from audio data representing audio in the environment where the device is disposed, a noise occurring in the environment;
    determining an amplitude value associated with the noise;
    determining that the amplitude value satisfies a threshold amplitude value; and causing, based at least in part on determining that the amplitude value satisfies the threshold amplitude value, a display of the device to present a visual alert in synchronization with the output of the audible alert.

7. The method of claim 1, further comprising:
generating a graphical user interface configured to:
present an option to select from one or more audible alert types to associate with the audible alert; and
receive user input data indicating selection of the one or more audible alert types;
receiving, via the graphical user interface, the user input data indicating the selection of the one or more audible alert types; and
associating the selection with the account data such that the audible alert corresponds to the selection of the one or more audible alert types.

8. A system, comprising:
one or more processors; and
non-transitory computer-readable media storing instructions that, when executed by the one or more processors, cause the one or more processors to perform operations comprising:
determining a status change of an item order;
determining attributes of the item order;
determining to provide an audible alert about the item order based at least in part on the status change and the attributes of the item order;
identifying predefined audio data associated with the status change;
determining that an environment where a device associated with the item order is disposed includes multiple speakers;
associating individual ones of the multiple speakers with a portion of the environment, the portion of the environment associated with one or more functions associated with the item order;
determining that the status change is associated with a specific portion of the environment;
selecting a speaker from the multiple speakers based at least in part on the speaker being associated with the specific portion of the environment; and
causing output, utilizing the predefined audio data and by the speaker, of the audible alert about the item order.

9. The system of claim 8, the operations further comprising:
generating a graphical user interface configured to:
present an option to generate synthesized speech from text as the audible alert; and
receive user input data representing the text;
receiving, via the graphical user interface, the user input data representing the text; and
generating the predefined audio data from the user input data, the predefined audio data representing the synthesized speech.

10. The system of claim 8, the operations further comprising:
determining that a different audible alert is to be output while the audible alert is being output;
selecting a first sound for the different audible alert predetermined to harmonize with a second sound of the audible alert; and
causing output of the first sound and the second sound simultaneously.

11. The system of claim 8, the operations further comprising:
generating a machine learning model configured to determine audio characteristics to apply to audible alerts in light of environmental characteristics of environments where audio-output devices are to be utilized for outputting the audible alerts;
receiving feedback data indicating performance of the machine learning model to determine the audio characteristics;
generating a training dataset from the feedback data;
training the machine learning model utilizing the training dataset such that a trained machine learning model is generated; and
determining specific audio characteristics to apply to the audible alert utilizing the trained machine learning model.

12. The system of claim 8, the operations further comprising:
determining that a person located in the environment is closest to the speaker of the multiple speakers based at least in part on analysis of audio data from microphones disposed in the environment; and
wherein selecting the speaker is further based at least in part on determining that the person is closest to the speaker of the multiple speakers.

13. The system of claim 8, the operations further comprising:
determining a user of multiple users that is situated in the environment where the device is disposed when the audible alert is to be output;
determining a user profile associated with the user; and
selecting the audible alert from multiple audible alerts based at least in part on characteristics of the user profile.

14. The system of claim 8, the operations further comprising:
determining a user of multiple users that is situated in the environment where the device is disposed when the audible alert is to be output;
determining a user profile associated with the user; and
wherein selecting the speaker is further based at least in part on characteristics of the user profile.

15. A system, comprising:
one or more processors; and
non-transitory computer-readable media storing instructions that, when executed by the one or more processors, cause the one or more processors to perform operations comprising:
determining a status change of an item order;
determining attributes of the item order;
determining to provide an audible alert about the item order based at least in part on the status change and the attributes of the item order;
identifying predefined audio data associated with the status change;
determining a user of multiple users that is situated in an environment where a device associated with the item order is disposed when the audible alert is to be output;
determining a user profile associated with the user;
selecting one or more of (1) the audible alert from multiple audible alerts based at least in part on characteristics of the user profile and (2) a speaker from multiple speakers disposed in the environment to output the audible alert on based at least in part on the characteristics of the user profile; and causing output, utilizing the predefined audio data and by the speaker, of the audible alert about the item order.

16. The system of claim 15, the operations further comprising:
receiving, from a camera associated with the environment, image data representing one or more images of the environment;
detecting, utilizing the image data, a person within a field of view of the camera;
determining, utilizing the image data, a distance of the person from the camera; and
determining a volume to output the audible alert at based at least in part on the distance.

17. The system of claim 15, the operations further comprising:
determining, from the user profile, a venue type associated with the environment;
determining a set of the multiple audible alerts associated with the venue type; and
enabling selection of the audible alert from the set of the multiple audible alerts associated with the venue type.

18. The system of claim 15, the operations further comprising:
generating a machine learning model configured to determine audio characteristics to apply to audible alerts in light of environmental characteristics of environments where audio-output devices are to be utilized for outputting the audible alerts;
receiving feedback data indicating performance of the machine learning model to determine the audio characteristics;
generating a training dataset from the feedback data;
training the machine learning model utilizing the training dataset such that a trained machine learning model is generated; and
determining specific audio characteristics to apply to the audible alert utilizing the trained machine learning model.

19. The system of claim 15, the operations further comprising:
associating individual ones of the multiple speakers with a portion of the environment, the portion of the environment associated with one or more functions associated with the item order;
determining that the status change is associated with a specific portion of the environment; and
wherein selecting the speaker from the multiple speakers is based at least in part on the speaker being associated with the specific portion of the environment.

20. The system of claim 15, the operations further comprising:
determining that a person located in the environment is closest to the speaker of the multiple speakers based at least in part on analysis of audio data from microphones disposed in the environment; and
wherein selecting the speaker is based at least in part on determining that the person is closest to the speaker of the multiple speakers.

* * * * *